INVENTORS
Samuel L. Williams
BY John W. Rush
Frank E. Miller
ATTORNEY

April 1, 1952     S. L. WILLIAMS ET AL     2,591,224
FLUID PRESSURE BRAKE EQUIPMENT
Filed Aug. 31, 1948     3 Sheets-Sheet 3

INVENTORS
Samuel L. Williams
John W. Rush
BY Frank E. Miller
ATTORNEY

Patented Apr. 1, 1952

2,591,224

UNITED STATES PATENT OFFICE 2,591,224

FLUID PRESSURE BRAKE EQUIPMENT

Samuel L. Williams, New York, N. Y., and John W. Rush, Wilkinsburg, Pa., assignors to Westinghouse Air Brake Company, a corporation of Pennsylvania Application August 31, 1948, Serial No. 47,046

44 Claims. (Cl. 303—3)

1

This invention relates to brake equipment for vehicles adapted to be controlled from either end and to be operated individually or in trains, such as subway cars or the like, and more particularly to brake equipment embodying a plurality of different control means.

The principal object of the invention is the provision of an improved brake equipment of the above general type which is relatively light in weight, simple in design and inexpensive.

Other objects and advantages will become apparent from the following more detailed description of the invention.

Figure 1:
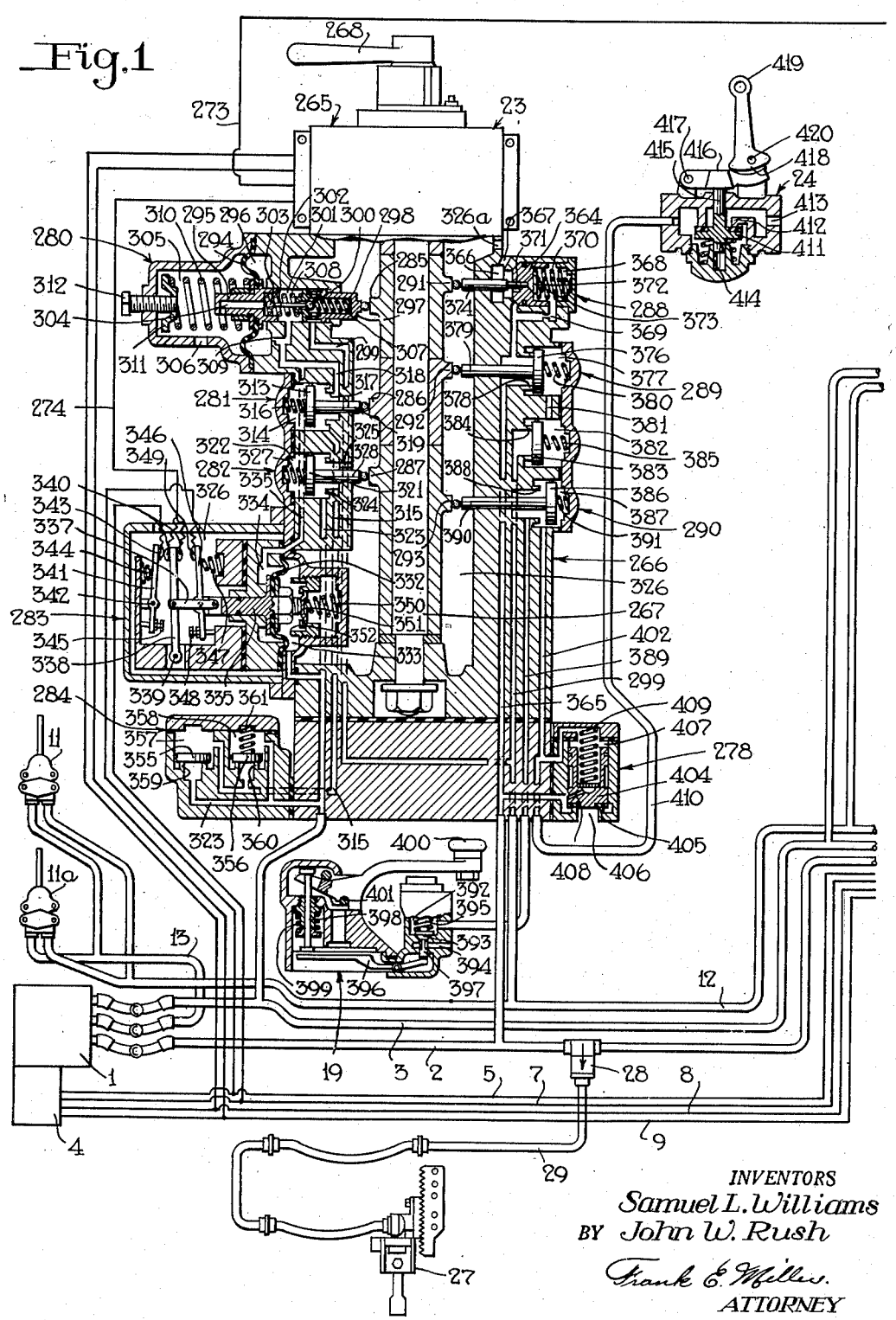
Figure 2:
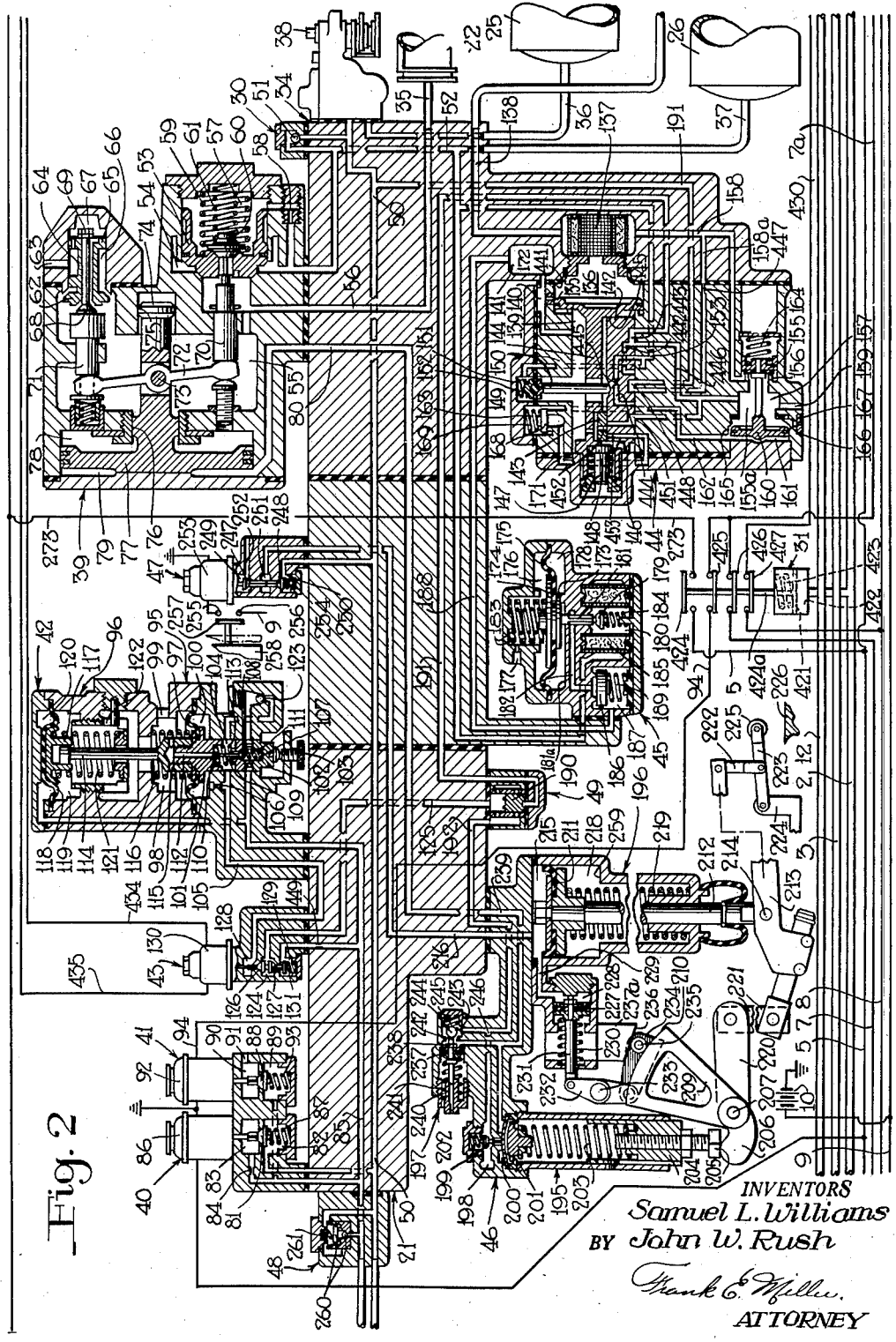
Figure 3:
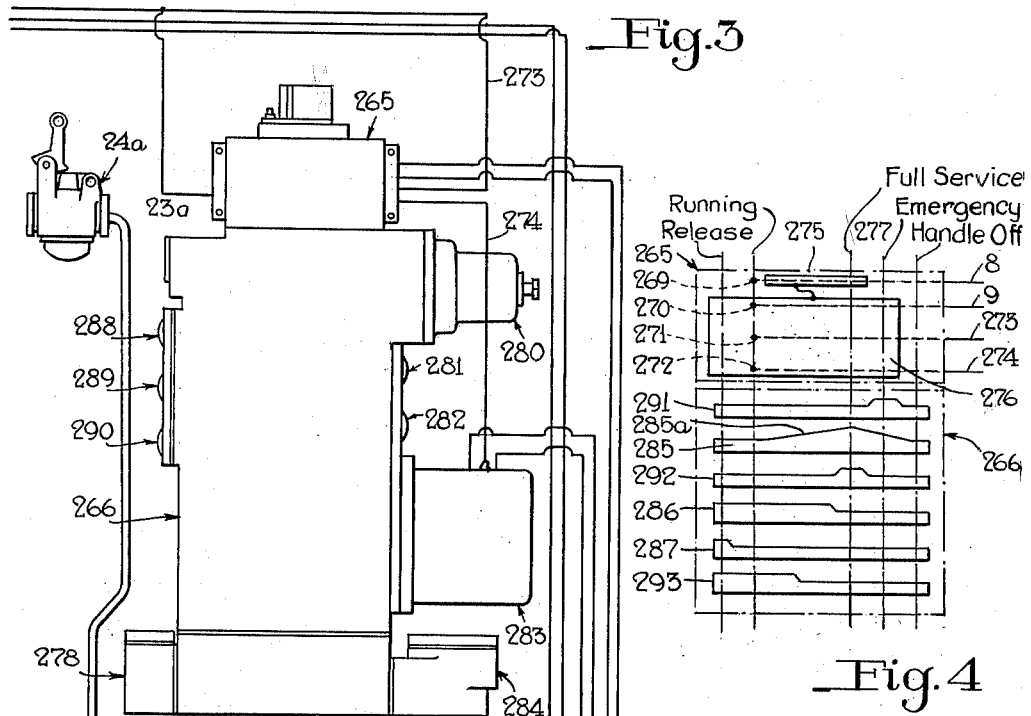
Figure 4:
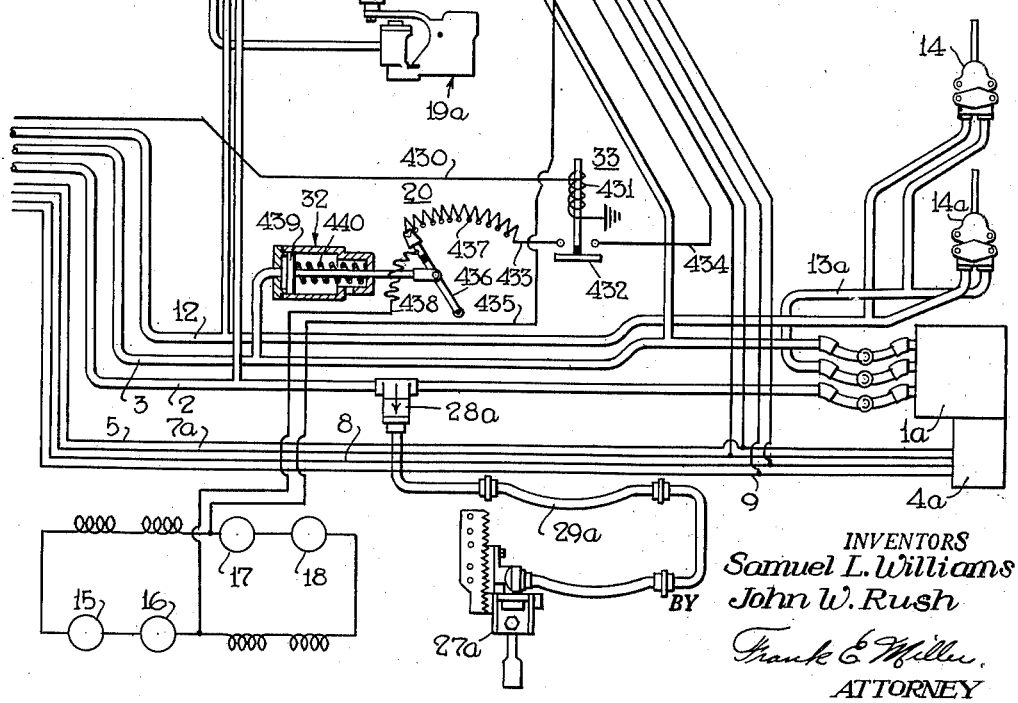

In the accompanying drawings; Figs. 1, 2 and 3, when arranged with the right-hand edges of Figs. 1 and 2 matched to the left-hand edges of Figs. 2 and 3, respectively, is a diagrammatic view, partly in section and partly in outline, of a brake equipment embodying the invention; and Fig. 4 is a development view of switch and valve portions of an operator's brake valve device shown in Figs. 1 and 3.

Description

As shown in Figs. 1 and 3 of the drawings, the reference numerals 1, 1a designate automatic car and air couplers of the usual tight-lock type, such as employed at opposite ends of subway cars, for automatically connecting together adjacent ends of two cars and for at the same time automatically establishing through the couplers fluid pressure communications between pipes on the connected cars, such as a brake pipe 2 and a straight-air pipe 3, in the present instance. Reference numerals 4 and 4a designate electric train wire connectors carried by the couplers 1 and 1a, respectively, for automatically connecting train wires on one car to corresponding train wires on another car upon coupling of the couplers between the cars, the wires involved in the present instance being a brake application wire 5, a brake release wire 7, 7a a dynamic brake wire 8 and an electric supply wire 9. On each car the supply wire 9 may be connected with one pole of an electric battery 10 the other pole of which may be grounded.

Reference numerals 11, 11a designate two uncoupling valves arranged to be located at opposite sides of the car at the end carrying the coupler 1 and either of which may be operated by a trainman to supply fluid under pressure from a pipe 12 (hereinafter called a feed valve pipe) to said coupler by way of a pipe 13 for effecting uncoupling operation of said coupler to uncouple it from a connected car. Similar uncoupling valves

2

14, 14a connected to pipe 12 and adapted to be located at the opposite sides of the opposite end of the car are connected by a pipe 13a to coupler 1a for effecting uncoupling operation thereof.

Further description of the structure so far described and a more detailed showing thereof in the drawings are not deemed essential in the present application since such structures are so well known generally. Moreover, the specific car, air and electric coupler apparatus adapted for use on cars for which the brake equipment embodying the invention is particularly intended, is fully disclosed in the application of John Canetta and Mortimer B. Cameron, Serial No. 774,398, filed September 16, 1947, now Patent No. 2,553,809, issued May 22, 1951, and assigned to the assignee of the present application, to which reference may be made.

Reference numerals 15, 16, 17 and 18 designate electric driving motors for the car and numerals 19, 19a designate identical motor controller handle devices, one at either end of the car, for controlling through well-known means (not shown) supply of power to the thereby operation of said motors to propel the car, said handle devices being of the usual safety type, as will be explained in greater detail later. The motors 15 to 18 are adapted to act as generators to supply energy to a dynamic brake resistor 20 to provide dynamic braking action on the car, as will also be described later.

The brake equipment for the car comprises, in addition to the structure already mentioned, a brake controlling valve device 21 for controlling supply and release of fluid under pressure to and from a brake cylinder device 22, two identical operator's brake valve devices 23, 23a adapted to be located at opposite ends of the car, two identical conductor's valve devices 24, 24a also adapted to be located near opposite ends of the car, a source of fluid under pressure such as a main reservoir 25 adapted to be charged by a compressor (not shown) on the car, and a brake supply reservoir 26. The brake equipment further comprises two automatic closing trip valve devices 27, 27a located at opposite ends of the car and connected respectively through pipes 29, 29a and check valves 28, 28a to the brake pipe 2, said check valves being located directly at the connection with said brake pipe and being arranged to permit flow of fluid under pressure in the direction from the brake pipe to said devices but to prevent flow in the opposite direction. The trip valve devices 27, 27a may be of any desired well-known type adapted to be operated by a trip (not shown) along the track for venting fluid under pressure from the brake pipe 2 and to automatically close the vent from said brake pipe when disengaged from the track trip. The brake equipment further comprises an emergency contactor 31 connected to the brake pipe 2, a dynamic brake actuator 32 and a lock-out relay device 33.

The brake controlling device 21 comprises a bracket 34 to which the brake cylinder device 22, main reservoir 25 and supply reservoir 26 are connected by pipes 35, 36 and 37 respectively. The brake pipe 2, straight-air pipe 3 and feed valve pipe 12 are also connected to bracket 34. Mounted on and carried by the bracket 34 is a feed valve device 38, a brake cylinder pressure relay valve device 39, application and release magnet valve devices 40 and 41, respectively, an inshot valve device 42, a lockout magnet valve device 43, an emergency valve device 44, a quick action chamber charging valve device 45, a variable load device 46, a reset magnet valve device 47, a main reservoir charging check valve device 48, a double check valve device 49, and a check valve device 30.

The feed valve device 38 may be of any conventional structure having fluid pressure connections with the main reservoir 25 and a passage 50 in the bracket 21 and adapted to operate when the main reservoir 25 is charged with fluid under pressure to supply fluid therefrom to passage 50 at a desired reduced pressure, such as 110 pounds. The passage 50 is connected to the emergency valve device 44, to the reset magnet valve device 47, to the application magnet valve device 40, to and through the casing of the main reservoir charging check valve device 48 to the feed valve pipe 12, and said passage is also connected to the check valve device 30 which comprises a check valve 51 arranged to permit flow of fluid under pressure from the feed valve passage 50 to another passage 52 in the bracket but to prevent reverse flow. The passage 52 in the bracket is connected to pipe 37 leading to the supply reservoir 26 whereby said reservoir will be normally charged with fluid of the pressure supplied by the feed valve device 38. Passage 52 also leads to the brake cylinder relay valve device 39, to the emergency valve device 44 and to the quick action charging valve device 45.

The brake cylinder pressure relay valve device 39 may be the same as that fully disclosed in U. S. Patent No. 2,096,491, issued to Ellis E. Hewitt on October 19, 1947, and briefly, comprises a fluid pressure supply valve 53 arranged to control communication between a chamber 54 at one side of said valve and a chamber 55 which is open by way of a passage 56 to pipe 35 and thence the brake cylinder device 22. At the opposite side of the supply valve 53 is a chamber 57 open through a choke 58 to the fluid pressure supply passage 52 and containing a spring 59 acting on said valve for urging it toward a seated position, in which it is shown in the drawing, for closing communication between the chambers 54 and 55. The supply valve 53 is provided with an axial bore connecting chamber 57 to chamber 55 and slidably mounted in this bore is the fluted stem of a pilot valve 60 contained in chamber 57. A spring 61 in chamber 57 acts on the pilot valve 60 for urging it to a seat against the supply valve 53. With the pilot valve 60 seated fluid under pressure in passage 52 will equalize through choke 58 into chamber 57 to provide a force on the supply valve 53 which, acting in conjunction with the pressure of spring 59, will seat said valve. Upon unseating of the pilot valve 60 fluid will be released from chamber 57 at a rate sufficiently exceeding the rate of supply thereto by way of choke 58 to reduce the pressure in said chamber to a relative low degree to facilitate unseating of the supply valve 53.

The relay valve device further comprises a release valve 62 arranged to control communication between chamber 55 and an atmospheric release port 63. The release valve 62 is provided on one end of a stem 64 the opposite end of which is carried by a plunger 65 which is slidably mounted in a bore in the casing. Between the release valve 62 and plunger 65 the stem 64 is encircled by an annular cavity 66 which is constantly open to the exhaust passage 63. At the opposite end of plunger 65 is a chamber 67 and said plunger, the stem 64 and valve 62 are provided with an axial bore connecting said chamber to chamber 55. A pilot release valve 68 contained in chamber 55 has a fluted stem slidably extending through this axial bore into chamber 67 wherein a washer 69 secured to the stem is arranged to contact the adjacent face of plunger 65.

The supply valve 53 and the release valve 62, and therefore the respective pilot valves 60 and 68 are arranged in the casing in spaced relation and with their axes parallel with each other. A plunger 70 slidably mounted in a suitable bore in the casing has one end in engagement with the end of the stem of the application pilot valve 57, while a parallel arranged plunger 71 also slidably mounted in the casing has one end connected to the release pilot valve 68. The opposite end of plunger 70 is engaged by one end of a lever 72 the opposite end of which is connected to the plunger 71, and intermediate its ends said lever is fulcrumed on a pin 73 carried by a plunger 74 which is slidably mounted in the casing in two spaced bearings 75 and 76. Beyond the bearing 76 plunger 74 is connected to one side of a piston 77. At the plunger side of piston 77 is a chamber 78 open to chamber 55 by way of slight clearance (not shown) around the plunger 74 in bearing 76, while at the opposite side of said piston is a control chamber 79 open to a passage 80 in the bracket.

The operation of the relay valve device 39 is as follows:

When fluid under pressure is supplied to passage 80 and thence to the control chamber 79 at one side of piston 77 such pressure acting on said piston will move it in the direction of the right hand. The consequent movement of plunger 74 will initially rock lever 72 in a clockwise direction about the pin 73 relative to the plunger 70 engaging the stem of the supply pilot valve 60 for thereby moving the release pilot valve 68 into contact with the release valve 62 followed by seating of said release valve. After the release valve 62 is thus seated further movement of the piston 77 will rock lever 72 in the opposite direction about pin 73 to unseat the pilot supply valve 60 for reducing the pressure of fluid in the supply valve chamber 57 and for then unseating the supply valve 53 to permit flow of fluid under pressure from passage 52 to chamber 55 and thence through passage 56 to the brake cylinder device 22 for applying the brakes on the car. As fluid under pressure is thus supplied to the brake cylinder device 22, it will equalize from chamber 55 past the bearing 76 into chamber 78 and therein act on piston 77 in opposition to the pressure of control fluid in chamber 79. When the pressure of fluid thus obtained in the brake cylinder device 22 and in chamber 78 is increased to a degree substantially equal to the control pressure in chamber 79, the pressure in chamber 78 will actuate piston 77 in a direction toward chamber 79 for thereby rocking lever 72 in a clockwise direction to permit springs 59 and 61 to seat first the supply valve 53 and then the supply pilot valve 60 for terminating supply of fluid under pressure to the brake cylinder device 22 and thereby limiting the pressure of fluid in said brake cylinder device to substantially that provided in piston chamber 79. If the pressure of fluid in chamber 79 is further increased the relay valve device will operate as just described to correspondingly increase the pressure of fluid in the brake cylinder device 22. If, on the other hand, the pressure of fluid in chamber 79 is reduced in response to release of fluid under pressure from passage 80, the pressure of fluid in chamber 78 will move the piston 77 back to the position in which it is shown in the drawing. As the piston 77 is thus operated it will pull the release pilot valve 68 away from its seat on the release valve 62 whereupon fluid under pressure will flow from chamber 55 into chamber 67 and in the latter chamber acting on plunger 65 will substantially balance the pressure of fluid in chamber 55 acting on the release valve 62. As the piston 77 moves further in the direction of chamber 79 the engagement of washer 69 with the plunger 65 will unseat the release valve 62 to permit release of fluid under pressure from chamber 55 and the brake cylinder device 22 to effect a release of brakes on the car. If the pressure of fluid in chamber 79 is not reduced to atmospheric pressure, then when the pressure of fluid in the brake cylinder device 22 and thereby in chambers 55 and 78 of the relay valve device becomes reduced to a degree slightly lower than that acting in chamber 79 the latter pressure will actuate the piston 77 to seat the pilot valve 68 against the release valve 62 and to then seat the latter valve for thereby preventing further release of fluid under pressure from said brake cylinder device 22 and said chambers and for holding therein fluid at substantially the same pressure as still effective in piston chamber 79. Upon complete release of fluid under pressure from the piston chamber 79 the piston 77 will remain in the position in which it is shown in the drawing and in which the pilot release valve 68 and the release valve 62 are both open to permit a complete release of fluid under pressure from the brake cylinder device 22 and from chambers 55 and 78. It will therefore be seen that the relay valve device 38 will operate to reproduce in the brake cylinder device 22 substantially the same pressure of fluid as provided in piston chamber 79.

The application magnet valve device 40 comprises a valve 81 contained in a chamber 82 open to the fluid pressure supply passage 50 and arranged to control communication between said chamber and a chamber 83 which is open through an application timing choke 84 to a passage 85 in the bracket. The application magnet valve device further comprises a magnet 86 connected to the application train wire 5 and adapted upon energization to open the valve 81. Upon deenergization of magnet 86 a spring 87 is provided for closing the valve 81. The passage 85 in the bracket is connected through the main reservoir charging check valve device 58 to the straight-air pipe 3 and is also connected to the lockout magnet valve device 43 and to the inshot valve device 42.

The release magnet valve device 41 is of the same construction as the application magnet valve device 40 and comprises a valve 88 contained in the chamber 89 and arranged to control communication between said chamber and a chamber 90 which is open to atmosphere through a vent passage 91. The chamber 89 is constantly open to the bracket passage 85 and thence to the straight air pipe 3. The release magnet valve device further comprises a magnet 92 operative upon energization to open the valve 88. A spring 93 acts on valve 88 for closing it upon deenergization of the magnet 92. The magnet 92 is connected by a wire 94 to the emergency contactor 31.

The inshot valve device 42 comprises a self-lapping valve device 95 and a delay portion 96. The self-lapping valve device comprises a flexible diaphragm 97 clamped around its edge in the casing and subject on one side to atmospheric pressure in a chamber 98 which is open to atmosphere through a passage 99. At the opposite side of diaphragm 97 is a chamber 100. Secured centrally to diaphragm 97 is a plunger 101 extending through chamber 100 into a bore in the casing and also mounted in said bore and adjustable to a chosen position therein by an adjusting screw 103 is a plunger 102, the two plungers 101 and 102 cooperating with each other and with the casing to form a chamber 104 between them. The chamber 104 is open to a passage 105 leading to the lockout magnet valve device 43 and said passage is also open to chamber 100 through a stabilizing choke 106. The plunger 102 has a chamber 107 in constant communication with bracket passage 85 and therefore with the straight-air pipe 3 and containing a valve 108 arranged to control communication between said chamber and chamber 104 through an axial bore in said plunger, said valve being mounted on one end of a stem 109 loosely extending through said bore into chamber 104 wherein a release valve 110 is mounted on the other end of said stem. A spring 111 in chamber 107 acts on the valve 108 for urging it to its seated or closed position against plunger 102. The plunger 101 has an axial bore 112 open at one end to atmosphere and open at the opposite end through a seat for the release valve 110 to chamber 104. A light spring 113 contained in chamber 104 and acting oppositely on the plungers 101 and 102 is provided for maintaining the latter plunger in contact with the adjusting screw 103.

A stem 114 extending through chamber 98 is connected at one end to the diaphragm 97 and has a passage 115 connecting the bore 112 in plunger 101 to chamber 98 and thence to atmosphere. Encircling the stem 114 is a spring 116 acting on the diaphragm 97 with a chosen force for urging it in the direction of chamber 100. The end of stem 114 opposite that connected to diaphragm 97 is slidably mounted in a bore provided in a follower 117 which engages one side of a diaphragm 118 clamped around its edge in the casing. At the side of diaphragm 118 engaged by the follower 117 is a chamber 119 open to atmosphere by way of chamber 98, while at the opposite side is a pressure chamber 120 which is in constant communication with bracket passage 85 and thereby with the straight-air pipe 3. A spring 121 contained in chamber 119 has one end bearing against the diaphragm follower 117. The opposite end of spring 121 is supported by an adjustable seat 122 screw-threaded in the casing. The seat 122 is adjusted to provide a force of spring 121 against the follower 117 and diaphragm 118 such as to hold them in the position in which they are shown in the drawing, defined by contact of said diaphragm with the casing against a chosen pressure of fluid, such as 35 pounds, in chamber 120 and to permit deflection of said diaphragm against said spring when the pressure is increased above this chosen degree. With the diaphragm in the position in which it is shown in the drawing the end of stem 114 is adapted to be spaced away slightly from the bottom of the bore in follower 117.

The inshot valve device further comprises a release check valve 123 so arranged in a communication connecting chamber 104 to the bracket passage 85 as to permit flow of fluid under pressure from the former to the latter but to prevent reverse flow.

The adjusting screw 103 is regulated to position the plunger 102 so that the supply valve 108 will be closed, as well as the release valve 110, when the diaphragm 97 assumes a position against spring 116 corresponding to a certan pressure of fluid in chamber 100, such as ten pounds. With chamber 100 void of fluid under pressure the diaphragm 97 will be deflected by spring 116 to unseat the supply valve 108.

In operation, assuming that fluid under pressure is supplied to the bracket passage 85 and thence to chamber 111 in the plunger 102, fluid will flow from said chamber past the valve 108 to chamber 104 and then through passage 105 to the lockout magnet valve device 43 and also through choke 106 into diaphragm chamber 100 wherein such pressure acting on diaphragm 97 will deflect it against spring 116 relative to diaphragm 118. As the diaphragm 97 is thus deflected the supply valve 108 will move with it under the pressure of spring 111, such movement being relative to the plunger 102, until eventually said valve becomes seated on said plunger to prevent further flow of fluid under pressure from the bracket passage 85 to passage 105, whereby the pressure of fluid in the latter passage will be limited to the chosen degree of 10 pounds hereinafter referred to as the "inshot," as determined by the pressure of spring 116 and the adjusted position of plunger 102. As the self-lapping valve device 95 operates as just described to provide a limited pressure of fluid in passage 105 upon supply of fluid under pressure to passage 85, the pressure in the latter passage will also become effective in chamber 120 above the diaphragm 118 but said diaphragm will remain in the position in which it is shown in the drawing until this pressure is increased to a chosen higher degree, such as 35 pounds, required to overcome spring 121, after which said diaphragm will move against said spring in accordance with further increase in such pressure. As the diaphragm 118 thus moves the follower 117 will be moved into contact with and then act through stem 114 on the diaphragm 97, supplementing the force of spring 116, and thereby actuate diaphragm 97 to unseat the supply valve 108 from the plunger 102 to permit further flow of fluid under pressure from passage 85 to passage 105. The pressure of fluid thus obtained in passage 105 will become effective through choke 106 in chamber 100 on diaphragm 97 and when increased to a degree sufficient to overcome the opposing force of spring 116 plus the pressure of fluid in chamber 120 in excess of the pressure of spring 121 on diaphragm 118, said pressure acting on diaphragm 97 will deflect it to permit seating of the supply valve 111 to thereby limit the increase in pressure in passage 105, over the ten pounds inshot initially permitted by spring 116 by itself, to a degree equal to the increase in pressure of fluid in chamber 120 over that required to deflect diaphragm 118 against spring 121. Thus if the pressure required in chamber 120 to overcome spring 121 is for example 35 pounds and such pressure is increased to 45 pounds a corresponding increase in pressure will occur in passage 105, or from ten to twenty pounds. Thus regardless of the increase of pressure in chamber 120 over the 35 pound pressure above mentioned, a corresponding increase will occur in passage 105. Upon release of fluid under pressure from passage 85 and diaphragm chamber 120 fluid will also be released from passage 105 and diaphragm chamber 100 by way of the check valve 123 and thence through passage 85.

The lockout magnet valve device 43 comprises a casing having a chamber 124 open by way of a passage 125 in the bracket to the double check valve device 49 and containing two oppositely seating poppet valves 126 and 127 which are coaxially aligned and arranged for movement in unison. The valve 126 is arranged to control communication between chamber 124 and a chamber 128 which is open to passage 105, while valve 127 is arranged to control communication between chamber 124 and a chamber 129 which is open to passage 85. The lockout magnet valve device further comprises a magnet 130 operative upon energization to open the valve 126 and to close the valve 127, and a spring 131 for opening valve 127 and closing valve 126 upon deenergization of magnet 130.

The emergency valve device 44 comprises a casing containing an emergency piston 135 at one side of which is a chamber 136 open through an air cleaner 137 and a passage 138 to brake pipe 2. At the opposite side of piston 135 is a valve chamber 139 open by way of a passage 140 to a quick action chamber 141 and containing a main slide valve 142 and an auxiliary slide valve 143 mounted on the main slide valve. The piston 135 is provided with a stem 144 extending through chamber 139 and having a notch in which the auxiliary slide valve 143 is mounted for movement with said piston. The main slide valve 142 is loosely mounted between a shoulder 145 on the piston and a shoulder 146 provided near the end of stem 144, and slidably mounted in a suitable bore in the end of said stem and normally projected by a spring 147 to a position slightly beyond the shoulder 146 is a plunger 148.

The emergency valve device further comprises a flexible diaphragm 149 clamped around its edge in the casing, and between one side of said diaphragm and the main slide valve 142 is interposed a seating pin 150. One side of diaphragm 149 is subject to pressure of fluid in the valve chamber 139 while at the opposite side is a chamber 151 containing a spring 152 acting on the diaphragm and also normally containing fluid under pressure acting on the diaphragm along with the spring to hold the slide valve 142 against its seat when valve chamber 139 is substantially void of fluid under pressure. Fluid under pressure is supplied to the chamber 151 from a passage 153 which is connected to the fluid pressure supply passage 52 in the bracket. Passage 153 also opens at the seat for the main slide valve 142.

The emergency valve device further comprises a brake pipe vent valve device comprising a vent valve 155 arranged to cooperate with a seat 156 for controlling communication between a chamber 157 open to the interior of said seat and a passage 158 open to the exterior of said seat. The passage 158 is connected to the brake pipe 2 and through the air cleaner 137 to the emergency piston chamber 136, while chamber 157 is open to atmosphere through a vent passage 159. The vent valve 155 is connected to one end of a stem 155a to the opposite end of which is connected an actuating piston 160 subject on one side to atmospheric pressure in chamber 157 and on the opposite side to pressure of fluid in a chamber 161 which is open by a passage 162 to a check valve chamber 163. A spring 164 acting on the vent valve 155 is provided for moving said valve to its closed position and for moving the actuating piston 160 to a normal position in which these parts are shown in the drawing. In this position of piston 160 a leakage groove 165 is opened connecting chamber 161 to the atmospheric chamber 157 to prevent accumulation of fluid pressure in the former chamber by leakage. Upon supply of fluid under pressure to chamber 161 by way of passage 162, in a manner which will be later described, the piston 160 is adapted to move from its normal position, in which it is shown in the drawing, to a position in contact with a gasket 166 for opening the vent valve 155 and in which latter position the leakage groove 165 will be closed and a restricted port 167 will be open to piston chamber 161. In the normal position of piston 150, it will be noted, that port 167 is disconnected from chamber 161.

The check valve chamber 163 contains a check valve 168 and a spring 169 acting on said check valve for urging it into contact with a seat for closing communication between a passage 171 open to said check valve within said seat and chamber 163 which is open to passage 162. The pressure of spring 169 on the check valve 168 is such as to prevent unseating of said check valve by fluid in passage 171 at a pressure less than a chosen degree, such as 35 pounds. Passage 171 leads to the seat for the main slide valve 142.

The charging valve device 45 comprises a casing containing a flexible diaphragm 175 clamped around its edge in the casing and subject on one side to atmospheric pressure in a chamber 176 which is open to atmosphere through a breather port 177. At the opposite side of diaphragm 175 is a chamber 178. A poppet valve 179 contained in a chamber 180 has a fluted stem 181 arranged in coaxial relation with the diaphragm 175 and slidably mounted in a suitable bore in the casing. The valve stem 181 extends through a passage 182 into chamber 178 where its end contacts a follower 173 mounted against diaphragm 175. The valve stem 181 is fluted from the valve 179 through the passage 182 while the remainder of the stem is of cylindrical form. The chamber 178 is open to passage 182 as by way of a small port 181a to permit pressure of fluid in said chamber to vary substantially in unison with variations in pressure in passage 182. Two springs 183 contained in chamber 176 act through a follower 174 on diaphragm 175 for deflecting same in a direction to open valve 179, while a bias spring 184 contained in chamber 180 acts on valve 179 for urging it to a closed position. The pressure of springs 183 is such as to require a chosen pressure of fluid in chamber 178 for deflecting diaphragm 175 against said springs, said pressure being for example thirty-five pounds.

The valve chamber 180 is open through an air cleaner 185 to the bracket passage 52 connected to the supply reservoir 26. The passage 182 is adapted to be opened past a check valve 186 to a chamber 187 connected to a passage 188 leading to the quick action chamber 141. The check valve 186 is provided to prevent flow of fluid under pressure in the direction from passage 188 to passage 182 and a light seating spring 189 contained in chamber 187 and acting on said check valve is provided for seating same.

The double check valve device 49 comprises a double check valve 190 open at one end to passage 125 from the lock-out magnet valve device 43 and at the opposite end to a passage 191 connected through the bracket 34 to the seat of the main slide valve 142 in the emergency valve device 44. The double check valve 190 is adapted to selectively operate in response to supply of fluid under pressure to either passage 125 or passage 191 to open said passage to a passage 192 and to close communication between passage 192 and the one of the two passages 125 and 191 containing fluid at lesser pressure.

The variable load device 46 may be the same as that disclosed in U. S. Patent No. 2,147,347, issued to S. L. Williams on February 14, 1939, and, briefly, comprises a brake cylinder pressure limiting valve device 195, adjusting mechanism 196 for said limiting device, and a by-pass valve device 197.

The limiting valve device 195 comprises a casing having a chamber 198 containing a valve 199 which is provided with a fluted stem extending through a suitable bore in the casing into a chamber 200 at one side of a flexible diaphragm 201 which engages said stem. A bias spring 202 in chamber 198 acts on the valve 199 urging same to its seat, while a regulating spring 203 acts on the diaphragm 201 for urging the valve 199 away from its seat. A movable plunger 204 slidably mounted in a suitable bore in the casing has one end in engagement with spring 203, while an adjusting screw 205 projecting from the opposite end of plunger is adapted to be engaged by an arm 206 secured to a rockable shaft 207 which is rotatably carried in a bracket (not shown) formed integral with the casing. Also secured to the shaft 207 is one end of an arm 209 which at its other end is provided with a curved surface 210 in the form of an arc of a circle.

The adjusting mechanism 196 comprises a casing containing a strut piston 211 having a stem 212 which extends through an opening to the exterior of the casing where it is operatively connected to a lever 213 by a pin 214. At one side of piston 211 is a chamber 215 connected by a passage 216 to the reset magnet valve device 47. At the opposite side of piston 211 through which the stem 212 projects is a chamber 218 containing a spring 219 acting on piston 211 for urging it to a normal position in which it is shown in the drawing.

An arm 220 is also secured at one end to shaft 207 while its other end is connected to one end of the lever 213 by a link 221. The other end of lever 213 is connected to one end of a tie rod 222 the other end of which is connected to a lever 223 intermediate its ends. One end of lever 223 is pivotally mounted on a sprung part 224 of the car. The other end of lever 223 is provided with a roller 225 adapted upon clockwise rotation of said lever to engage an unsprung portion of the car, such as a spring plank 226 of the car truck.

The casing of the adjusting mechanism further contains a locking piston 227 at one side of which is a chamber 228 connected by a passage 229 to the strut piston chamber 215, a spring 230 being provided to act on the other side of said locking piston to urge same to a locking position in which it is shown in the drawing.

The piston 227 is provided with a stem 231 the end of which is connected to one end of a lever 232 which is fulcrumed intermediate its end on a pin 233 which may be carried by the same bracket (not shown) as shaft 207. A link 234 connected to the other end of lever 232 carries a friction locking element, such as a roller 235, at its opposite end, said roller being disposed between the curved surface 210 on arm 209 and a surface 236 provided on a lug 237a projecting from the casing, the surface 236 being so arranged with respect to the curved surface 210 that roller 235 will act as a wedge between said surfaces to lock the arm 209 in an adjusted position.

The by-pass valve device 197 comprises a piston 237 at one side of which is a chamber 238 open to a passage 239 connected to diaphragm chamber 200 and also to passage 80 in the bracket leading to the relay valve device 39. At the opposite side of piston 237 is an atmospheric chamber 240 containing an adjustable spring 241 which acts on said piston for urging it to a normal position in which it is shown in the drawing. The piston 237 is provided with a pin 242 extending through an opening in the casing into a chamber 243 wherein said pin engages and normally holds unseated a valve 244 which is subject to the opposing pressure of a bias spring 245 acting to seat said valve. The chamber 243 containing valve 244 is open to a passage 246 connected to valve chamber 198 in the limiting valve device 195 and also connected to the bracket passage 192 leading to the double check valve device 49.

The variable load device 46 is adjustable for limiting the degree of an emergency application of brakes on the car in accordance with the car load, and for controlling adjustment thereof the reset magnet valve device 47 is provided.

The reset magnet valve device comprises two coaxially aligned oppositely seating poppet valves 247 and 248 contained in chambers 249 and 250, respectively, and having fluted stems extending in the direction of each other and meeting in an intermediate chamber 251. Chamber 250 is connected to the feed valve passage 50 in the bracket so as to be constantly supplied with fluid under pressure. Chamber 249 is open to atmosphere through a vent passage 252, while chamber 251 is connected to the bracket passage 216 leading to the strut piston chamber 215. The reset magnet valve device further comprises a magnet 253 operative upon energization to close valve 247 and to open valve 248, while upon deenergization of said magnet a spring 254 is provided for closing valve 248 and opening valve 247. One terminal of magnet 253 may be grounded while the other terminal may be connected to a fixed contact 255 of a switch device having another fixed contact 256 adapted to be connected to any suitable source of electrical energy such as the electric supply wire 9. A movable contact 257 is provided for electrically connecting the fixed contacts 255 and 256. The movable contact 257 may be controlled by a door on the car, such door being indicated by the reference numeral 258, in such a manner that the contact 257 will electrically connect the fixed contacts 255 and 256 only when the car door 258 is open.

Adjustment of the variable load device 46 for limiting the degree of an emergency application of brakes on the car is effected in the following manner.

When the car door 258 is opened causing energization of magnet 253 and thereby closing of valve 247 and opening of valve 248, fluid under pressure from the feed valve passage 50 will flow past the latter valve to chamber 251 and thence through bracket passage 216 to the strut piston chamber 215 and from the latter chamber through passage 229 to the locking piston chamber 228. Fluid under pressure thus supplied to the strut piston chamber 215 will move said piston outwardly against spring 219 into engagement with a shoulder 259 in the casing and thereby rotate lever 213 about its fulcrum connection with link 221 until the roller 225 engages the truck spring plank 226. When sufficient pressure has been built up in chamber 228 on the locking piston 227 to overcome the opposing force of spring 230 said piston will move against said spring and actuate lever 232 to move roller 235 out of locking engagement with surfaces 236 and 210. With the parts in the condition just described the limiting valve spring 203 acting through plunger 204, adjusting screw 205, arms 206 and 220, link 221, lever 213, link 222 and lever 223 will hold the roller 225 against the truck spring plank 226, this being the condition of last adjustment of these parts to a change in load. Now if the load on the car is increased, the body of the car will sink toward the spring plank 226 and thereby operate lever 223 to turn the shaft 207 in a clockwise direction for operating arm 206 to move the plunger 204 inwardly and compress or increase the pressure of the limiting valve spring 203. In case there is a reduction in the load carried by the car and the car body moves away from the truck spring plank 226 the limiting valve spring 203 will expand in order to maintain roller 225 in engagement with the spring plank 226 and in so doing the pressure of said spring will be reduced. In other words the pressure of the limiting valve spring 203 will be increased in accordance with an increase in car load and reduced in proportion to a reduction in car load and it will be noted that since the arm 209 is secured to shaft 207 its position will also change according to the change in car load.

After a change in car load has been effected the closing of the car door 258 will effect deenergization magnet 253 and thereby closing of valve 248 and opening of valve 247 whereupon fluid under pressure will be released from the strut piston chamber 215 and also from the locking piston chamber 228. The pressure of spring 230 on the locking piston 227 is such that it will cause said piston to respond to reduction in pressure in chamber 228 before the strut piston 211 can move upon reducing the pressure in chamber 215, as a result of which, the locking piston 227 will be actuated to draw the locking roller 235 into locking engagement with the surfaces 236 and 210 before the strut piston 211 is able to move away from the shoulder 259. Then when the pressure in the strut piston chamber 215 is reduced sufficiently, the pressure of spring 219 will return the strut piston to its normal position in which it is shown in the drawing, and during such movement said piston will operate the stem 212, lever 213, tie rod 222 and lever 223 to lift the roller 225 out of contact with the truck spring plank 226.

With the roller 235 in locking engagement with surfaces 236 and 210 and the strut piston 211 returned to its normal position as above described the position of the plunger 204 and and thereby adjustment of the pressure limiting spring 203 will be maintained until subsequent opening of door 258 and possible change in car load requiring a change in such adjustment.

The main reservoir charging check valve device 48 comprises two check valves 260 arranged in a communication between the straight-air pipe 3 and feed valve passage 50 for permitting flow of fluid under pressure in the direction to said passage under conditions to be later described. A spring 261 acts on one of the check valves 260 for urging it to its closed position.

The two brake valve devices 23, 23a are identical in construction and operation in view of which only one is shown in the drawing in section and will now be described.

The brake valve device 23 comprises a casing embodying an electric contact portion 265 and a pneumatic portion 266 arranged with the electric portion mounted on top of the pneumatic portion and through both of these portions there extends an operating shaft 267 adapted to be connected at an end outside of the casing to a removable operator's handle 268 having release, running, full service, emergency and handle-off positions arranged in the order named for counterclockwise rotation of said handle, as shown in the development view in Fig. 4 of the drawing, the space between the running and full service positions constituting a service brake application zone.

The electric portion 265 of the operator's brake valve may comprise four fixed contacts 269, 270, 271 and 272 (Fig. 4) connected respectively to the dynamic brake wire 8, to the electric supply wire 9 and to wires 273 and 274, the wire 273 extending between the two brake valve devices 23, 23a. The electric portion may further comprise a drum 275 having a pair of movable contacts 276 and 277, the contact 276 being arranged for contact with fixed contacts 270, 271 and 272 in all positions of the brake valve handle 268 except handle-off position. The contact 277 is adapted to be connected and supply electric current to the fixed contact 269 from a position slightly out of running position to a position intermediate the full service and emergency positions, such supply of electric current being derived from a suitable source such as the supply wire 9 via contact 270 for the purpose of illustration in the present application.

The pneumatic portion 266 of the operator's brake valve device 23 comprises at one side of the shaft 267 extending therethrough, a self-lapping straight-air control valve device 280, a cut-off valve device 281, a straight-air release valve device 282, a master switch device 283 and a "limp in" check valve device 284, the brake valve shaft 267 being provided with cams 285, 286 and 287 for controlling the devices 280, 281 and 282, respectively. At the opposite side of shaft 267 there is an emergency valve device 288, an emergency application release valve device 289, a suppression valve device 290, and a brake pipe vent valve device 278, said shaft being provided with cams 291, 292 and 293 for controlling operation of the devices 288 to 290, respectively.

The self-lapping straight-air control valve device 280 is substantially the same in structure as the valve device 95 associated with the inshot valve device 42 and, briefly, comprises a casing containing a diaphragm 294 to the center of which is connected a plunger 295 extending through a chamber 296 at one side of the diaphragm and into one end of a bore in the casing. Also slidably mounted in this bore is a second plunger 297 arranged for operation by the cam 285. The plunger 297 is provided interiorly with a chamber 298 constantly open to a passage 299 extending through the casing and connected to feed valve pipe 12. A supply valve 300 contained in chamber 298 is arranged to control communication between said chamber and a chamber 301 formed between the adjacent ends of plungers 295 and 297 by way of an axial bore in the latter plunger. The valve 300 is mounted on one end of a stem 302 loosely extending through the axial bore just mentioned into chamber 301 wherein a release valve 303 is connected to the opposite end of the stem and arranged to cooperate with a seat on plunger 295 for controlling communication between chamber 301 and an axial bore 304 in plunger 295 which opens to a chamber 305 at the side of diaphragm 294 opposite chamber 296. Chamber 305 is in constant communication with atmosphere through a passage 306. A bias spring 307 contained in chamber 298 acts on the supply valve 300 for urging it to its seat. A spring 308 in chamber 301 supported at one end on plunger 295 bears against the plunger 297 for urging it to against the cam 285. Chambers 301 and 296 are in communication one with the other through a stabilizing choke 309. A control spring 310 in chamber 305 bears against diaphragm 294 in opposition to pressure of fluid in chamber 296, said spring being supported at the end opposite to said diaphragm on a seat 311 carried by an adjusting screw 312.

The cam 285 is so designed that the plunger 297 will assume a normal or brake release position, in which it is shown in the drawing, in the release, running and handle-off positions of the handle 268 and, as shown in Fig. 4, is provided with a sloping surface 285a arranged to effect gradual displacement of the plunger 297 into the respective casing 4 in proportion to movement of the operator's control handle 268 from running position toward full service position. The position of plunger 297 in emergency position of the operator's control lever 268 is immaterial but as will be apparent from Fig. 4 of the drawing said plunger will be displaced to some degree from normal position, this being incident to the design of cam.

With the operator's control handle 268 in the release or running position the adjusting screw 312 will be so regulated that the pressure of spring 308 will hold the plunger 297 against the cam 285 and will also move the diaphragm 294 and thereby the plunger 295 to a position against spring 310 in which the release valve 303 is just opened. When the operator's control lever 268 is in full service position the self-lapping valve device 280 will provide in chamber 301 a chosen maximum degree of pressure, such as 67 pounds, for effecting an electro-pneumatic or a purely pneumatic application of the brakes on the car, as will be described hereinafter.

The cut-off valve device 281 comprises a check valve 313 contained in a chamber 314 which is open to a passage 315, a spring 316 acting on said check valve for urging it into contact with a seat 317 for closing communication between chamber 314 and a passage 318 leading to chamber 301 in the self-lapping straight-air control valve device 280. The check valve 313 is provided with a stem 319 projecting through a suitable bore in the casing for operation by cam 286, said cam being so designed as to permit seating of said valve against its seat 317 only in the full service, emergency and handle-off positions of the operator's control lever 268, it being apparent therefore that in all other positions of said lever, said valve will be unseated.

The straight-air release valve device 282 is structurally the same as the cut-off valve device 281 and briefly comprises a check valve 321 contained in a chamber 322 open by way of a passage 323 to the straight-air pipe 3 and arranged to cooperate with a seat 324 for closing communication between said chamber and a release passage 325 which may be open to atmosphere by way of a cavity 326 within the brake valve device and a passage 326a. A spring 327 acts on the valve 321 for urging it into contact with seat 324. The valve 321 is provided with a stem 328 extending through a bore in the casing for engagement by cam 287. The cam 287 is so designed as to open the check valve 321 only in release position of the operator's control lever 268. In all other positions of the lever 268 the check valve 321 will be seated.

The master switch device 283 comprises a flexible diaphragm 332 clamped around its edge in the casing and open at one side to a chamber 333 connected to passage 323 and thereby to the straight-air pipe 3, while at the opposite side of the diaphragm is a chamber 334 open through a passage 335 to passage 318 connected to chamber 301 in the self-lapping straight-air application valve device 280. Secured centrally at one end to the diaphragm 332 is a stem 335 slidably mounted in a suitable bore in the casing and extending into a switch contact chamber 336 wherein it is pivotally connected by a link 337 to a movable contact 338. The contact 338 is pivoted at one end on a pin 339 and at the opposite end is provided with an electric contact 340 connected to wire 274 leading to the contact portion 265 of the brake valve device. At one side of the contact arm 338 is a release contact arm 341 pivoted on a pin 342 and provided at one end with a release contact 343 arranged for contact by the contact 340 on the arm 338. A spring 344 urges the arm 341 in the direction to bring contact 343 into contact with 340 such movement being limited by an adjusting screw 345. At the opposite side of contact arm 338 is an application contact arm 346 like the contact arm 341 but oppositely arranged and provided at one end with an application contact 349 for engagement with contact 340 on arm 338. A spring 347 acts on arm 346 for urging contact 349 in the direction of the contact 340 as limited by an adjusting screw 348.

The application contact 349 is connected to the application train wire 5. The release contact 343 in the brake valve device 23 is connected by wire 7 to the emergency contactor device 31 while the corresponding contact in the brake valve device 23a at the opposite end of the car is connected by wire 7a to the emergency contactor device 31, for reasons which will be hereinafter brought out. A bias spring 350 contained in diaphragm chamber 333 acts through a follower 351 on plunger 335 for urging the diaphragm 332 and thereby the contact arm 338 into contact with the release contact arm 341, the casing being provided with a stop 352 for engagement with the follower 351 in this position of the contact arms.

The "limp in" check valve device 284 comprises two check valves 355 and 356 contained in chambers 357 and 358 open to passages 315 and 323, respectively. The check valve 355 is arranged to cooperate with a seat 359 for closing communication between chamber 357 and passage 323 leading to the straight-air pipe 3, while the check valve 356 is arranged to cooperate with a seat 360 for closing communication between passage 323 and passage 315. A spring 361 acts on the check valve 356 for urging it into contact with its seat 360 with a force so related to the pressure of spring 350 on diaphragm 332 in the master switch device 283 as to permit deflection of said diaphragm against spring 350 with a slightly less differential in opposing fluid pressures in chambers 334 and 333 than the differential in pressures in passages 315 and 323 required to unseat the check valve 356 against spring 361.

The brake valve emergency valve device 288 comprises a valve piston 364 arranged to cooperate with a seat at one side for closing communication between a passage 365 open to the brake pipe 2 and a chamber 366 which is open to atmosphere as by way of a passage 367. At the opposite side of valve piston 364 is a chamber 368 connected through a restricted port 369 to the brake pipe passage 365 and containing a spring 370 acting on said valve piston for urging it to its closed position. The valve piston 364 is provided with an axial bore in which is slidably mounted a fluted stem 371 extending from a poppet valve 372 contained in chamber 368 and which when unseated is adapted to release fluid under pressure from said chamber at a rate exceeding the rate of supply through choke 369 for thereby reducing the seating pressure on said valve piston. A spring 373 acts on the pilot valve 372 for urging it to its seat. A pin 374 slidably mounted in a suitable bore in the casing operatively connects the pilot valve stem 371 to the cam 291, said cam being so designed as to actuate pin 374 to unseat the pilot valve 372 and then contact the valve piston 364 for unseating same only in emergency position of the operator's control handle 268. In all other positions of the handle 268 the valve piston 364 and the pilot valve 372 are both adapted to be seated.

The emergency application release valve device 289 comprises a check valve 376 contained in a chamber 377 and arranged to cooperate with a valve seat 378 for controlling communication between said chamber and passage 365 which is open to the brake pipe. The check valve 376 is provided with a stem 379 extending through a suitable bore in the casing into alignment with the cam 292 and said cam is so designed as to effect unseating of said check valve only in full service position of the operator's control handle 268. The check valve chamber 377 contains a spring 380 acting on check valve 376 for urging it to its seat 378 and said chamber is open through a passage 381 to a chamber 382 containing a check valve 383 arranged to cooperate with a seat 384 for preventing flow of fluid under pressure from chamber 382 to passage 299 leading to the feed valve pipe 12 but to permit flow of fluid under pressure in the opposite direction. A bias spring 385 acts on the check valve 383 for urging it into contact with seat 384.

The suppression valve device 290 comprises a check valve 386 contained in a chamber 387 and arranged to cooperate with a seat 388 for controlling communication between said chamber and a passage 389 leading to the power controller handle device 19. The check valve 386 is provided with a stem 390 extending through a suitable bore in the casing for operation by cam 293, said cam being operative to hold said check valve open in the release and running positions of the operator's control valve handle 268 and to a chosen position between the running and full service positions of said handle corresponding to a certain safe degree of brake application on the car. In all other positions of handle 268 the check valve 386 is adapted to be seated under the pressure of a spring 391.

The passage 389 is open to a chamber 392 in the safety control handle device 19 which chamber contains a check valve 393 arranged to control communication between chamber 392 and a vent passage 394 which leads to atmosphere. A spring 395 contained in chamber 392 acts on the check valve 393 for urging it to its closed position. Below the check valve 393 a lever 396 fulcrumed in the casing has one end arranged for engagement with a stem 397 projecting from the check valve 393 for unseating said valve. A pin 398 is provided for operation by a spring 399 to actuate the lever 396 to unseat the valve 393, but during propulsion of the car the pin 398 is adapted to be held out of contact with lever 396 by depression of a safety control handle 400 about a fulcrum pin 401. Upon release of handle 400 the spring 399 is adapted to actuate the lever 396 as just mentioned.

Chamber 387 in the suppression valve device 290 is connected by a passage 402 to the vent valve device 278 which comprises a valve piston 404 arranged to cooperate with a seat 405 for controlling communication between the brake pipe passage 365 and a vent port 406 at one side of said piston. At the opposite side of the valve piston 404 is a chamber 407 in constant communication with passage 402 and open through a restricted charged port 408 to a brake pipe passage 365. A spring 409 contained in chamber 407 acts on the valve piston 404 for urging it to the seat 405.

Passage 402 is also connected to a pipe 410 leading to the respective conductor's valve device 24 which comprises a check valve 411 arranged to cooperate with a seat 412 for controlling communication between said pipe and an atmospheric vent passage 413. A spring 414 acts on the check valve 411 for urging it to its seat 412. The check valve is provided with a pin 415 extending therefrom into contact with a lever 416 fulcrumed at one end on a pin 417, the other end of the lever being arranged for contact by the cam end 418 of an operator's lever 419 which is fulcrumed on a pin 420, said cam end being so designed that upon movement of the operator's lever 419 in either direction from a normal position in which it is shown in the drawing the lever 416 will be operated to open the valve 411.

The conductor's valve device 24a is identical to the conductor's valve device 24 and connected to the brake valve device 23a in the same manner.

The brake pipe contactor device 31 comprises a cylinder containing a piston 421 subject on one side to pressure of fluid in a chamber 422 which is connected to the brake pipe 2, and subject on the opposite side to the opposing pressure of a spring 423, said spring exerting a force on the piston 421 such as to require a chosen pressure in the brake pipe 2, such as 90 pounds to move said piston against said spring. Projecting from the piston 421 to the exterior of the casing is a rod 424a carrying four electrical contacts 424, 425, 426 and 427. The contact 424 is provided for establishing an electrical connection to the application wire 5 from wire 273, connected to the electric control portion 265 of the operator's brake valve devices 23, 23a, when pressure of fluid in the brake pipe 2 is below the chosen pressure of 90 pounds above mentioned. When the pressure in the brake pipe 2 is in excess of this chosen pressure the contact 424 is adapted to break the electrical connection between wire 273 and the application wire 5. The movable contact 425 is arranged to connect the release magnet wire 94 to wire 7a leading to the brake valve device 23a at one end of the car when the brake pipe pressure is in excess of the chosen degree above mentioned and this connection is arranged to be broken when the brake pipe pressure is less than said chosen degree. The movable contact 426 is provided for connecting wire 7 from the brake valve device 23 at the opposite end of the car to the wire 7a when the brake pipe pressure is in excess of the chosen degree above mentioned, it being thus seen that when the brake pipe pressure is in excess of the chosen degree the release magnet 92 will be connected to both of the operator's brake valve devices 23, 23a, and when at a lower degree said magnet will be disconnected from both of said brake valve devices. The movable contact 427 is arranged to electrically connect the dynamic train wire 8 to a wire 430 when the brake pipe pressure is in excess of the chosen degree above mentioned and to break such connection when less than said chosen degree.

Wire 430 is connected to a magnet coil 431 of the lockout relay device 33. The lockout relay device 33 further comprises a contact 432 operative upon energization of the magnet coil 431 to electrically connect a wire 433 from one terminal of the dynamic brake resistor 20 to a wire 434 connected to one terminal of magnet 130 of the lockout magnet valve device 43. The other terminal of the magnet 130 is connected to a wire 435. The dynamic brake resistor comprises a resistance 437 and a rheostat arm 436 adapted to be adjusted across said resistance and connected to a wire 438. For the purpose of illustrating a simple dynamic brake circuit, the two wires 435 and 438 may be connected across the propulsion motors 15, 16, 17 and 18 in such a manner that with contact 432 of the lockout relay device 33 electrically connecting wires 433 and 434, said motors will act as generators to provide dynamic braking of the car. The degree of such braking is adapted to be varied by adjustment of the rheostat arm 436 with respect to the resistance 437, and the magnet 130 of the lockout magnet device 43 being connected in series with said resistance is adapted to be energized by current generated by said motors when the car is operating above a chosen speed, such as ten miles per hour. When the car speed is less than 10 miles per hour magnet 130 in lockout magnet device 43 is adapted to be deenergized.

The dynamic brake actuator 32 is provided for varying the amount of resistance 437 effective during dynamic braking in inverse proportion to the pressure of fluid in the straight-air pipe 3 and to this end comprises a cylinder containing a piston 439 subject on one side to pressure of fluid in the straight-air pipe 3 and on the opposite side to pressure of a spring 440.

Initial charging of the brake equipment

Let it be assumed that the equipment is completely void of fluid under pressure, the brake valves 23, 23a are in handle-off position, and the operator enters the car and starts up the air compressor (not shown) to charge the main reservoir 25 and thereby the brake equipment, preparatory to taking the car out for operation.

As fluid under pressure is thus supplied to the main reservoir 25 it will flow through pipe 36 to the feed valve device 38 and through same to passage 50 in the bracket 34 and will so continue until the pressure in said passage is built up to the desired degree determined by adjustment of said feed valve device, which may be such as to limit the pressure of fluid in said passage to, for example, 110 pounds. As fluid under pressure is thus supplied to the feed valve passage 50 in the pipe bracket it will flow into the supply valve chamber 250 of the reset magnet device 47 the magnet of which may be assumed to be deenergized so that the supply valve 248 will be closed. Fluid will also flow from passage 50 to valve chamber 82 in the application magnet valve device 40 the magnet 86 of which will be deenergized with the brake valve device 23, 23a in handle-off position so that valve 81 will be seated. From passage 50 fluid under pressure will also flow to the feed valve pipe 12 connected to the two brake valve devices 23 and 23a.

At each of the brake valve devices fluid under pressure will flow from pipe 12 into passage 299 and thence past check valve 383 and through passage 381 into valve chamber 377 of the emergency application release valve device, the valve 376 of which is at this timed closed. Fluid under pressure supplied to passage 299 will also flow into the supply valve chamber 298 of the self-lapping straight-air application control valve device 280, the supply valve 300 in said chamber being closed at this time.

Fluid under pressure supplied to passage 50 in the bracket 26 will also flow to the seat of the main slide valve 142 of the emergency valve device 44. The emergency piston 135 and the slide valves 142 and 143 will at this time be assumed to be in emergency position defined by engagement of said piston with a gasket 441 due to previous venting of the brake pipe 2 upon removal of the brake valve handle 268 as will be later brought out, and in this position the end of passage 50 will be lapped by the main slide valve 142.

As fluid under pressure is supplied to the feed valve passage 50 in the bracket 34, as just described, it will also flow past the ball check valve 51 to passage 52 and thence to the supply valve chamber 54 in the relay valve device 39, to the supply reservoir 26, through branch passage 153 to the seat of the main slide valve 142 of the emergency valve device 44 and to valve chamber 180 in the charging valve device 45. The valve 179 in the charging valve device will at this time be open by springs 183 so that fluid supplied to chamber 180 will flow past said valve to passage 182 and thence past the check valve 186 to passage 188 and the quick action chamber 141 and from said chamber through passage 140 to the emergency valve chamber 139 wherein such pressure will increase to hold the piston 135 in its emergency position along with the main slide valve 142 and auxiliary slide valve 143. The charging valve device 45 will thus continue to supply fluid under pressure to the quick acting chamber 141 and slide valve chamber 139 until such pressure effective past the valve stem 181 of the charging valve device 45 in diaphragm chamber 178 becomes increased to a degree sufficient to overcome the opposing force of springs 183 whereupon the diaphragm 175 will deflect against said springs and permit closing of valve 179 by spring 184. The charging valve device 45 will thus operate to cut off the supply of fluid under pressure to the quick action chamber 141 and the slide valve chamber 139 when the pressure in said chambers is increased to a chosen degree, such as 35 pounds.

In emergency position of the main slide valve 142 the valve chamber 139 will be connected past the left-hand end of said valve to passage 171 leading to the seated side of check valve 168 but the spring 169 acts on said check valve with such force as to hold said valve seated against the 35 pounds pressure obtained in chamber 139 by operation of the charging valve device 45.

With the emergency slide valve 142 in emergency position, as above described, passage 153 will be open through a port 442 and a cavity 443 in said valve to passage 191 whereby as fluid under pressure is supplied to the former passage past the check valve 51 such fluid will flow to passage 191 and thence to the lower end of the double check valve 190. Passage 125 open to the opposite end of the double check valve 190 will at this time be at atmospheric pressure, as a result of which the double check valve 190 will be moved to its upper position for opening communication between passages 191 and 192, whereupon fluid under pressure from the former passage will flow to the latter and thence past the by-pass valve 244 in the variable load device 46 and through passage 239 to piston chamber 79 in the relay valve device 39. The relay valve device will thereby be operated, as above described, to supply fluid to the brake cylinder device 23 at a pressure corresponding to that provided in piston chamber 79 for applying the brakes on the car.

After the brake equipment has become charged to a pressure such as that at which valve 179 in the charging valve device 45 is closed, the operator may operate the brake valve handle 268 at the brake valve device 23 or 23a, to which it has been applied, from the handle-off position to the full service position in which the contact 276 in the respective electric contact portion 265 connects the electric supply wire 9 to wire 274 leading to the master switch portion 283 of the respective brake valve device and to wire 273 extending between the brake devices at the opposite ends of the car, it being noted the brake valve device to which handle 268 is not applied is still in handle-off position disconnecting therein the wires 8, 9, 273 and 274. The wire 273 is connected at this time by contact 424 in the emergency contactor device 31 to the application train wire 5 and thence to magnet 86 of the application magnet device 40 whereby said magnet will become energized and operate to open supply valve 81, upon movement of the brake valve device to full service position with consequent supply of electric current to wire 273. With the application magnet valve 81 thus open fluid under pressure will flow from the feed valve passage 50 in the bracket 34 to chamber 83 and thence through choke 84 to passage 85 and to the straight-air pipe 3. The lockout magnet device 43 is at this time deenergized so that fluid under pressure supplied by the application magnet valve device to passage 85 will also flow past the open valve 127 in said lockout magnet device to passage 125 and thence to the upper end of the double check valve 190, the lower end of said double check valve being subject at this time to pressure of fluid provided through passage 191 from the emergency valve device 44.

Operation of the brake valve handle 268 to full service position at the selected control station on the car will cause cam 285 to displace plunger 297 in the direction of diaphragm 294 and relative to said diaphragm due to the opposing pressure thereon of regulating spring 310. As a result, the release valve 303 will seat followed by plunger 297 moving out of contact with the supply valve 300 whereupon fluid under pressure from the fluid pressure supply or feed valve passage 299 will flow to chamber 301 and thence through passage 318 to the seated side of the cut-off valve 313, which at this time is closed, and also from passage 318 through passage 335 to diaphragm chamber 334 in the master switch device 283.

As fluid under pressure is thus supplied to passage 318 and to chamber 334 such pressure will become effective through choke 309 in chamber 296 in the self-lapping straight-air control valve device 280 to oppose the pressure of control spring 310 and will move the diaphragm 294 against said spring in accordance with the increase in pressure in chamber 296. As the diaphragm 294 thus deflects against control spring 310 the supply valve 300 will be gradually moved toward its seat by spring 307 and finally will become seated when the pressure in diaphragm chamber 296, and thereby in the connected passage 318 and chamber 334, becomes increased to a degree sufficient to counterbalance the pressure of spring 310. In full service position of the brake valve handle 268 a maximum pressure, such as sixty-seven pounds, will be thus obtained in diaphragm chamber 296 and the connected chamber 334 of the respective master switch device 283.

Chamber 333 at the opposite side of diaphragm 332 of the master switch device being open to the straight-air pipe 3 will be supplied with fluid under pressure upon energization of the magnet 86 of the application magnet valve device 40 to charge said pipe as above described, and this pressure may be increased to a degree (110 pounds as supplied by the feed valve device 38) exceeding that provided in chamber 334 at the opposite side of the diaphragm by movement of the brake valve handle 268 to full service position whereby the diaphragm 332 will be deflected to move the contact 340 into engagement with contact 343 for thereby connecting wire 274, at this time connected to the electric supply wire 9 through the contact portion 265 of the brake valve device, to either wire 7 or 7a, as the case may be, leading to the emergency contactor device 31 which, with the brake pipe 2 still uncharged with fluid under pressure, is in position disconnecting the wire 7 or 7a from wire 94 leading to the magnet 92 of the release magnet valve device 41, whereby the valve 88 in said release magnet valve device will remain seated for preventing loss of fluid under pressure from the straight-air pipe 3.

As above mentioned, the cut-off valve 313 is closed upon movement of the brake valve handle 268 to full service position, the purpose being to prevent the higher pressure (110 pounds) in the straight-air pipe 3 effective past the "limp in" check valve 355 in the cut-off valve chamber 314 becoming effective in chamber 296 of the self-lapping control valve device 280 which would cause operation of said device to dissipate to atmospheric pressure in excess of that (67 pounds) called for by the brake valve handle 268 in full service position. It is also desired to point out here that at the brake valve device not having the handle 268 and which therefore is in handle-off position, the cut-off valve 313 is also closed to disconnect the straight-air pipe 3 from the respective self-lapping control valve device 280 which otherwise would dissipate such pressure to atmosphere.

When the brake valve handle 268 is moved from handle-off to full service position and the straight-air pipe 3 is, as a result, charged with fluid at the pressure supplied by the feed valve device 38 as just described, valve 376 in the emergency application release valve device 289 is opened by the cam 292 whereupon fluid under pressure supplied from the feed valve pipe 12 past check valve 383 to the valve chamber 377 will flow past the valve 376 to passage 365 and thence to the brake pipe 2. The fluid under pressure thus supplied to the brake pipe 2 will flow therefrom to piston chamber 136 in the emergency valve device 44 and also through passage 158 and a branch 158a thereof containing a choke 477, to the seating face of the main slide valve 142. With the main slide valve 142 in emergency position a port 444 therein containing a choke 445 opens passage 158a to a passage 446 which opens to atmosphere by way of the vent valve piston chamber 157. It will thus be seen that upon supply of fluid under pressure to the emergency piston chamber 136 from the brake pipe 2, fluid will also be released from said brake pipe through chokes 447 and 445 and thence by way of passage 446, but the flow capacity of these chokes is such with respect to the supply of fluid under pressure to the brake pipe as to permit the pressure in piston chamber 136 to increase to a degree sufficiently in excess of that provided in the valve chamber 139 by the charging valve device 45, to actuate piston 135 to move the slide valves 142 and 143 to their release position in which they are shown in the drawing, and in which a restricted charging port 172 is opened to chamber 136 through which valve chamber 139 and quick action chamber 141 will become charged to the same pressure as provided in the brake pipe 2.

When the main slide valve 142 is moved to its release position upon charging of the brake pipe 2, as just described, passage 158a will be disconnected from the atmospheric passage 446 to close the vent from said brake pipe, and port 442 will be shifted to a position for disconnecting the supply reservoir passage 153 from passage 191 and the latter passage will be connected by the cavity 443 to the atmospheric passage 446, whereby fluid under pressure will be released from the lower end of the double check valve 190. Fluid from the straight-air pipe 3 supplied through passage 125 to the upper end of the double check valve 190 will then shift said double check valve to its lower position for connecting passage 125 to passage 192 whereby the brakes on the car will remain applied by pressure of fluid from the straight-air pipe.

When the brake pipe passage 158a is disconnected from the atmospheric passage 446 as the main slide valve 142 moves from its emergency position to its release position the former passage is opened through a cavity 448 in the slide valve to the feed valve passage 50 thereby establishing via choke 447 a brake pipe charging and pressure maintaining connection from said feed valve passage to the brake pipe 2 on the car which communication is independent of the brake valve device 23 or 23a in full service position.

Finally, when the pressure of fluid in brake pipe 2 is increased to a sufficient degree, such as ninety pounds, said pressure acting on piston 421 of the emergency contactor device 31 will overcome the opposing force of spring 423 and actuate the contact rod 424a to its normal position for disconnecting wire 273, supplied with current through the contact portion 265 of the operator's brake valve device 23 or 23a with the handle 268 in full service position, from the application train wire 5, whereupon the magnet 86 of the application magnet valve device 40 will be deenergized to permit closing of valve 81 and thereby the communication between the feed valve passage 50 in the bracket 34 and the straight-air pipe 3. This operation of the emergency contactor device 31 will also connect the dynamic brake wire 8 to wire 430 leading to the lockout relay device 33 which is of no consequence at the present time however, while the contacts 426 and 425 will be operated to connect wires 7 and 7a from the brake valve devices 23, 23a at opposite ends of the car to wire 94 leading to the magnet 92 of the release magnet valve device 41.

At this time the straight-air pipe pressure in diaphragm chamber 333 of the master switch device 283 in the brake valve device which the handle 268 is in full service position is in excess of the opposing pressure of fluid in chamber 334 provided by the respective self-lapping straight-air control valve device 280, whereby the diaphragm 332 will be deflected to a position to electrically connect wire 274, supplied with electric current through the contact portion 265 of the brake valve device, to wire 7 or 7a, as the case may be, and then through the emergency contactor to wire 94 leading to the release magnet valve device 41. The magnet 92 of the release magnet valve device 41 will thereby be energized and open valve 88 to effect release of fluid under pressure from the straight-air pipe.

As fluid under pressure is thus released from the straight-air pipe 3 the pressure of fluid in chamber 333 of the master switch device 283 at the controlling brake valve device will correspondingly reduce and when this pressure becomes reduced to a degree slightly below the opposing pressure of fluid in chamber 334 the diaphragm 332 will deflect and move the contact 340 out of contact with contact 343 which will effect deenergization of the release magnet 92 and closing of the valve 88 therein for preventing further release of fluid under pressure from the straight-air pipe.

As fluid under pressure is released from the straight-air pipe fluid will also be released from piston chamber 79 in the relay valve device 39 by way of passage 80 past the by-pass valve 244 in the variable load valve device 46, passage 192, past the upper end of the double check valve 190, through passage 125, the open valve 127 in the lockout magnet valve device 43 and thence by way of the straight-air pipe 3, whereby said relay valve device will operate to correspondingly reduce the pressure of fluid in the brake cylinder device 22.

It will now be seen that with the brake valve handle 268 in full service position following movement thereto from handle-off position, in initially charging the brake equipment, a maximum degree of brake application will be maintained until the pressure of fluid in the brake pipe 2 is increased to a relatively high degree for actuating the emergency contactor device 31, but with the operator's control handle 286 still in full service position the brakes will still be maintained applied by pressure equal to that provided by the self-lapping straight-air control valve device 280 in full service position of the handle 286.

In order to effect a complete release of fluid under pressure from the brake cylinder device 22 and thereby a complete release of brakes on the car, preparatory to moving the car, the operator, after operation of the brake pipe contactor 31 by brake pipe pressure, will move the brake valve handle 268 from full service position to either running position or release position.

Assuming that the operator's control handle 268 is moved to running position the cam 285 will be so adjusted as to permit pressure of fluid in chamber 301 plus the pressure of spring 308 to move the plunger 297 in the direction away from the diaphragm 294, due to which, the release valve 303 will be pulled from its seat to open chamber 301 to atmosphere by way of chamber 305. Upon opening chamber 301 to atmosphere as just mentioned fluid under pressure will be released from diaphragm chamber 334 in the master switch device 283 to permit the straight-air pipe pressure in chamber 333 at the opposite side of diaphragm 332 to actuate the switch contact 340 into contact with the release contact 343 for thereby effecting energization of magnet 92 of the release magnet valve device 41 and opening of valve 88 therein for releasing fluid under pressure from the straight-air pipe 2. Also in running position of the brake valve handle 268 the cut-off valve 313 will be opened to connect passage 315 to passage 318 and thence to chamber 301, so that at the controlling brake valve device some release of fluid under pressure will occur from the straight-air pipe past the "limp in" check valve 355 and thence through passage 315 to chamber 301 and past the release valve 295 in the self-lapping straight-air control valve device. As the pressure of fluid in chamber 301 of the self-lapping straight-air control valve device is thus reduced, a corresponding reduction will occur in diaphragm chamber 296 by way of choke 309, as a result of which, spring 310 will deflect the diaphragm 294 in the direction of the release valve 303 in accordance with the reduction in pressure in chamber 296, and this deflection will continue until the pressure of fluid in chambers 296, 301 and thereby in the connected straight-air pipe 3 is reduced to substantially that of atmosphere, whereupon the deflection will cease in a position in which the release valve 303 is still open.

As pressure of fluid in chamber 334 in the master switch device 283 is reduced to atmospheric pressure past the open release valve 303 as just described, the opposing straight-air pipe pressure in chamber 333 will be reduced past said valve as well as past the open valve 88 in the release magnet valve device 41, and through the lockout magnet device 43 the pressure of fluid in chamber 79 of the relay valve device 39 will also become reduced to atmospheric pressure by way of the straight-air pipe 3 for permitting operation of said relay valve device to effect complete release of fluid under pressure from the brake cylinder device 22 and thereby complete release of brakes on the car.

If the brake valve handle 268 is moved to release position, instead of to running position, for effecting a release of brakes, the only difference is that the check valve 321 in the straight-air release valve device 282 will be opened for connecting the straight-air pipe 3 directly to atmosphere by way of passage 325.

In initially charging the equipment the brake valve handle 268 may, if desired, be moved from full service position to the running or release position immediately upon the parts of the emergency valve device 44 moving to their release position and establishing therein the brake pipe charging communication by way of cavity 448 in the main emergency slide valve 142 through which the brake pipe will continue to charge up to full pressure. Then when the emergency contactor 31 operates in response to the further increase in brake pipe pressure to break the circuit of the application magnet 86 and make the circuit of the release magnet 92, a complete release of fluid under pressure from the straight-air pipe 3 will occur past the open release magnet valve 88, the magnet 92 of which will be maintained energized by the master switch device 283 in the release or running position of the brake valve handle 268, and also past the "limp in" check valve 355, as will be apparent from the above description.

It will be noted that at the brake valve device not having the handle 268 and which is in handle-off position chamber 334 of the master switch device will be constantly open to atmosphere through the respective self-lapping control valve device 280, while in chamber 333 open to the straight-air pipe 3 pressure will vary with that in the straight-air pipe, and the contact 340 will remain in engagement with contact 343, but this is of no consequence, since the respective contact wire 274 is not connected to the current supply wire 9 in the handle-off position.

The brake equipment is adapted to control the brakes on a car either normally on the electro-pneumatic principle or, in case of failure of supply of electric current or some part of the electro-pneumatic control system, such as the master switch device 283, on the purely pneumatic principle. When the electro-pneumatic system is operative the release position of the brake valve handle 268 need not be used for releasing an application of brakes but it is provided for use in case some part of the electro-pneumatic system fails as just mentioned and as will hereinafter be described in detail.

Upon movement of the brake valve handle 268 out of full service position to the running position or release position it will also be noted that the cut-off valve 313 is held open by cam 286 while the suppression valve 386 is opened by cam 293. The opening of the suppression valve 386 connects chamber 407 at one side of the vent valve piston 404 to passage 389 leading to the safety control handle device 19 which with handle 400 depressed permits closing of valve 393 and charging of chamber 407 with fluid under pressure from the brake pipe passage 365 via port 408 for holding the vent valve piston 404 seated.

The safety control handle 400 must be thus held depressed while propelling the car and when less than a chosen degree of brake application is in effect in order to prevent an undesired emergency application of brakes by opening of the vent valve piston 404, as will hereinafter be described.

It will also be noted that since chamber 407 of the vent valve device 403 is open through pipe 419 to the respective conductor's valve device 24 which is normally closed, said pipe will be normally charged with fluid under pressure.

From the above description it will now be seen that in initially charging the brake equipment, the emergency valve piston 135 and slide valves 142 and 143 will be held in emergency position by fluid under pressure supplied to valve chamber 139 by the charging valve device 45 to cause the brakes on the car to be applied. In order to effect movement of the emergency valve device 44 to its release position to obtain a release of brakes it is necessary that the brake pipe 2 be charged with fluid at a pressure exceeding that in the emergency valve chamber 139 which requires that the brake valve handle 268 be moved to full service position in which, upon movement of the emergency valve device 139 to release position, the brakes will be still maintained applied by energization of the magnet 86 of the application magnet valve device 40 and cannot be released, not only until the brake valve handle 286 is moved to either running or release position, but also until after the emergency contactor device 31 has been operated to close the circuit to the magnet 92 of the release magnet valve device 41 which does not occur until the brake pipe 2 is charged to the relatively high pressure of 90 pounds which is close to the maximum pressure of 110 pounds provided by the feed valve device 38 and finally obtained in the brake pipe.

Even if the operator should move the handle 268 to full service position immediately upon initiating charging of the equipment, for thereby establishing communication between the feed valve passage pipe 12 and the brake pipe 2 and thus the emergency piston chamber 136, the brakes on the car will be applied either by fluid under pressure supplied through the emergency valve device as hereinbefore described or past the open valve 81 in the application magnet valve device 40 and thence by way of the double check valve device 49, the magnet 86 of the application magnet device 40 being energized by way of contact 424 in the emergency contactor 31 until the brake pipe is substantially fully charged, as hereinbefore described. It is therefore essential that the brake valve handle 286 be held in full service position until the brake pipe pressure is increased to a degree at least sufficient to actuate the emergency valve device 44 to move to its release position following which the emergency contactor 31 must be operated before a release of brakes on the car can be obtained. In other words, in initially charging the equipment, regardless of whether the handle 268 is left in handle-off position and then moved to full service position as previously described, or is moved immediately to full service position, and regardless of whether it is moved from full service position to the running or release position prior to or after operation of the emergency contactor 31, the same result occurs, that is, that the brakes on the car will be held applied until after the brake pipe pressure is increased to near its normal degree of 110 pounds to ensure safety of the car upon movement thereof.

It is however desired to point out that it is preferable, in initially charging the equipment on the car that the brake valve handle 268 be left in handle-off position at least until after closing of valve 179 in the charging valve device 45 and then be moved to full service position for charging the brake pipe 2 as above described, since by so doing, less fluid under pressure will be lost by way of the vent from the brake pipe through port 445 and passage 446 in the emergency valve device 44 in emergency position thereof than if this vent were effective during charging from the initiation thereof if the brake valve handle 268 were moved to full service position immediately upon initiating such charging.

*Electro-pneumatic straight-air application of brakes*

With the brake equipment fully charged with fluid under pressure and hence with the emergency valve device 44 in release position opening the lower face of the double check valve 190 to atmosphere, and the opposite face of the double check valve being also open to atmosphere past the unseated valve 88 in the release magnet valve device 41 which is energized with handle 268 of the operator's control device in running or release position, if it is desired to effect an electro-pneumatic straight-air application of brakes on the car, the handle 268 will be moved from the release or running position in the direction of the full service position a distance corresponding to the degree of brake application desired.

This operation of handle 268 through the medium of cam 285 will displace plunger 297 in the direction of diaphragm 294 in the respective self-lapping straight-air control valve device 280 and thereby move said plunger out of engagement with the supply valve 300. Fluid under pressure will then flow from the feed valve supply pasage 299 past the supply valve 300 to chamber 296 and thence through passage 335 to diaphragm chamber 334 of the master switch device 283. When the pressure thus obtained in chamber 334 becomes increased sufficiently it will deflect diaphragm 332 against the bias spring 350 and thereby disconnect the movable contact 340 from contact 343 connected to the release wire 7 and move said movable contact into engagement with 349 connected to the application train wire 5. As a result, the magnet 92 of the release magnet valve device 41 will be deenergized permitting closing of the release valve 88 by spring 93, and the magnet 86 of the application magnet valve device 40 will be energized to unseat valve 81, whereupon fluid under pressure will flow from the feed valve passage 50 through the application timing choke 84 to the straight-air pipe 3 and thence to chamber 333 of the master switch device 283.

Fluid under pressure will be supplied to chamber 334 of the master switch device 283 as above described until the pressure of fluid in chamber 296 of the self-lapping straight-air application control valve device 280 is increased to a degree sufficient for moving diaphragm 294 against spring 310 until the supply valve 300 becomes seated, whereby the pressure of fluid obtained in chambers 301, 296 and diaphragm chamber 334 of the master switch device will be limited in accordance with the extent of movement of the operator's control lever 268 from the running position in the direction of the full service position.

When the pressure of fluid obtained in the straight-air pipe 3 and in chamber 333 of the master switch device, as above described, is then increased by way of valve 81 in the application magnet valve device 40 to substantially the same degree as acting in chamber 334 of said switch device the former pressure plus the bias force of spring 350 will deflect the diaphragm 332 for moving the movable contact 340 to a lap position out of contact with contact 349 and also still out of contact with contact 343, whereby the magnet 86 of the application magnet valve device 40 will be deenergized to permit closing of the supply valve 81 by spring 87. It will thus be seen that through operation of the self-lapping straight-air application control valve device 280 and the master switch device 283 the pressure of fluid obtained in the straight-air pipe 3 upon operation of the operator's control lever 268 will be limited in accordance with the position of said lever.

If the operator desires to further increase the pressure of fluid in the straight-air pipe 3 he will move the brake valve handle 268 further toward full service position for thereby effecting further displacement of plunger 297 in the direction of diaphragm 294 whereupon the self-lapping straight-air control valve device 280 will cause operation of the master switch device 283 and application magnet valve device 40 to effect a corresponding further increase in pressure in the straight-air pipe 3. It will thus be seen that regardless of the position to which the brake valve handle 268 is moved between the running and full service positions a corresponding pressure may be obtained in the straight-air pipe 3 and such pressure may be stepped up as desired to the full service degree of for example 67 pounds when said handle obtains the full service position.

In case the pressure of fluid thus provided in the straight-air pipe 3 is greater than desired and the operator desires to reduce such pressure he will move handle 268 back in the direction of running position whereupon spring 308 will move the plunger 297 in the direction of the handle-operated shaft 267, due to which, the release valve 303 will be opened by stem 302 and the seated supply valve 300. Upon opening the release valve 303 fluid under pressure will be vented from chambers 301, 296 and chamber 334 of the master switch device 283 which will permit the opposing straight-air pipe pressure in chamber 333, plus the force of bias spring 350, to move the diaphragm 332 and thereby the movable contact 340 to the position shown in the drawing in which the magnet 86 of the application magnet valve device 40 remains deenergized while the magnet 92 of the release valve device 41 becomes energized. Energization of the latter magnet will effect opening of valve 88 for thereby releasing fluid under pressure from the straight-air pipe 3 and from chamber 333 on the master switch device 283. When the pressure of fluid in chamber 333 thus becomes reduced sufficiently for the opposing pressure in chamber 334 to deflect diaphragm 332 against the bias spring 350 such deflection will pull the movable contact 340 out of contact with the contact 343 for effecting deenergization of the magnet 92 of the release magnet valve device 41. The valve 88 in the release magnet valve device will therefore become seated by the pressure of spring 93 to prevent further release of fluid under pressure from the straight-air pipe 3 and from diaphragm chamber 333 in the master switch device 283. The pressure of fluid in the straight-air pipe 3 will thus be reduced in accordance with the reduction effected in chamber 334 by the change in position of the operator's control handle 268, and any desired reduction in such pressure may be obtained up to a full release of fluid under pressure from the straight-air pipe upon proper positioning of the handle 268 toward the running position or in the running or release position in which a full release will occur.

The cut-off valve 313 is open from release position nearly to full service position of the brake valve handle 268, so that as said handle is operated to cause supply of fluid under pressure to the straight-air pipe 3, fluid supplied to passage 318 in the straight-air application control valve device 280 will flow past said valve to passage 315 thence to chamber 357 above the check valve 355 and to the seated face of the check valve 356 in the "limp in" valve device 284. The spring 361 acting on the check valve 356 is of such value however as to insure sufficient pressure in chamber 334 of the master switch device 283 to cause operation thereof to energize the magnet 86 of the application magnet valve device 40 for supplying fluid under pressure to the straight-air pipe 3 without unseating the check valve 356, the opposite side of which is open to the straight-air pipe as previously described. In other words when a service application of brakes is being effected electro-pneumatically, as being described, the check valve 356 will remain seated under pressure of spring 361 in order to insure operation of the master switch device 283 to control pressure of fluid in the straight-air pipe 3.

Substantially coincident with supplying fluid under pressure to the straight-air pipe 3 in response to movement of the operator's control handle 268 out of running position, the dynamic brake wire 8 will be connected by contacts 277, 276 to the current supply wire 9 and current will therefore be supplied through the dynamic brake wire, the contact 427 of the emergency contactor device 31 and wire 430 to magnet coil 431 of the lockout relay device 33. The device 33 will be thereby energized and lift the movable contact 432 to the position for electrically connecting wires 433 and 434 thereby rendering the dynamic brake including the propulsion motors 15 to 18 and the resistance 20 effective to brake the car, it being noted that the dynamic brake circuit may include the magnet 130 of the lockout magnet valve device 43 so as to energize said magnet by current generated by said motors when the speed of the car is in excess of a chosen low speed, such as 10 miles per hour.

Energization of magnet 130 of the lockout magnet device 43 will seat valve 127 and open valve 126 for closing direct communication between the straight-air pipe passage 85 in the bracket and passage 125 leading to the upper end of the double check valve 190 and for opening the latter passage to passage 105 leading to the inshot valve device 42. Fluid under pressure supplied to the straight-air pipe 3 and to the bracket passage 85 in response to movement of the brake valve handle 268 toward full service position, will therefore flow from said passage initially only to the supply valve chamber 107 and diaphragm chamber 120 of the inshot valve device 42. The supply valve 108 in the inshot valve device being initially open fluid will flow from the supply valve chamber 107 past said valve to chamber 104 and thence through passage 105 past the open valve 126 in the lockout magnet valve device 43 to passage 125 leading to the upper end of the double check valve 190. Fluid under pressure will be thus supplied to the upper end of the double check valve 190 until the pressure of such fluid acting in chamber 100 of the inshot valve device 42 becomes increased to a degree sufficient to overcome the opposing force of spring 116, and permit diaphragm 97 to deflect against said spring to permit movement of the supply valve 108 relative to plunger 102 until it becomes seated thereon. The pressure of spring 116 is such as to thus permit seating of the supply valve 108 when the pressure of fluid obtained in passage 125 is increased to a chosen degree, such as 10 pounds, it being noted that at this time spring 121 acting on diaphragm 118 will prevent deflection of said diaphragm against spring 116 by the straight-air pressure effective in chamber 120. If, due to leakage of fluid under pressure from the straight-air pipe passage 85 past the supply valve 108, the pressure of fluid in passages 105 and 125 and thereby in diaphragm chamber 100 should tend to increase above the chosen degree above mentioned, the diaphragm 97 will be deflected by such pressure against spring 116 to open the release valve 110 for dissipating the excess pressure, whereby the pressure in said passages will be maintained at substantially the desired degree.

The fluid under pressure thus provided in passage 125 will flow past the double check valve 190 to passage 192 and thence through the variable load device 46 to piston chamber 79 in the relay valve device 39 and actuate the latter device to supply fluid to the brake cylinder device 22 at a corresponding pressure of 10 pounds. This pressure of fluid provided in the brake cylinder device is merely sufficient to fill the volume thereof and to move the usual brake shoes into contact lightly with the car wheels, so that when the pneumatic brake on the car becomes effective to bring the car to a stop after fading out of the dynamic brake, as will be hereinafter described, there will be no undue delay or roughness of car action at the time of such transfer.

Fluid under pressure supplied to the straight-air pipe 3 will also flow to the dynamic brake actuator 32 and move the piston therein against spring 440 to adjust the amount of resistance 437 cut into the dynamic brake circuit in proportion to the pressure of fluid in said pipe. The effectiveness of the dynamic brake can thereby be adjusted by operation of the brake valve handle 268 to provide the proper pressure of fluid in the straight-air pipe 3.

It is intended that the dynamic brake by itself will provide any desired rate of retardation of the car for any load on the car up to and including a full seated load. If, due to standing patrons on the car, the load of the vehicle is such that the desired rate of deceleration cannot be obtained by the dynamic brake alone, then the pressure of fluid in the straight-air pipe 3 may be increased by movement of the brake valve handle 268 further toward full service position to a degree in excess of for example 35 pounds corresponding to that necessary to provide maximum dynamic braking and also corresponding to the value of spring 121 in the inshot valve device 42, whereupon this pressure acting in chamber 120 on diaphragm 118 will overcome the opposing force of said spring and act through stem 114 in cooperation with spring 116 to deflect the diaphragm 97 in the direction of plunger 102 therein. This deflection of diaphragm 97 will open the supply valve 108 whereupon fluid under pressure from the straight-air passage 85 will flow past said valve to passage 105 and thence through the lockout magnet valve device 43, the double check valve 190, and the variable load device 46 to the relay valve device 39 and effect operation thereof to supply further fluid under pressure to the brake cylinder device 22. Fluid under pressure will thus continue to be supplied to the brake cylinder device 22 until the pressure of fluid supplied past the supply valve 108 in the inshot valve device 42 acting in chamber 108 on diaphragm 97 becomes increased to a degree sufficient to overcome the opposing force of spring 116 plus the pressure of fluid in diaphgram chamber 120 in excess of that required to balance spring 121. It will thus be seen that the pressure of fluid in chamber 108 of the inshot valve device and thereby in the brake cylinder device 22 will not be increased to the same degree as that acting in diaphragm chamber 120 but only in accordance with the increase in such pressure over the opposing force of spring 121. By thus supplying additional fluid under pressure to the brake cylinder device 22 the degree of braking of the car over that provided by the dynamic brake alone may be increased sufficiently to obtain the desired rate of car deceleration.

When the speed of the car has become reduced to for example 10 miles per hour where the effectiveness of the dynamic brake begins to reduce, the magnet 130 of the lockout magnet device 43 will become deenergized which will permit spring 131 to open valve 127 and close valve 126, whereupon pressure of fluid in the straight-air pipe passage 85 will equalize through a choke 449, past the open valve 127, through the double check valve 190 and the variable load valve device 46 into piston chamber 79 of the relay valve device 39 and operate said relay valve device to increase the pressure of fluid in the brake cylinder device 22 to substantially the same degree as acting in the straight-air pipe 3 for bringing the car to a stop. At around 4 miles per hour the effectiveness of the dynamic brake will be substantially nil, and the choke 449 is provided for regulating the rate at which the pneumatic brakes becomes effective as just described in accordance with the reducing effectiveness of the dynamic brake so as to minimize car shock upon transfer of braking from dynamic to purely pneumatic.

It is not intended that the variable load device 46 will have any limiting effect upon the degree of a service application of brakes so that except under a condition of a maximum service degree of application the check valve 244 in the by-pass valve device 197 will remain open during the application. In case of a maximum service application however the check valve 244 may close under pressure of fluid acting in chamber 238 in piston 237 just before the maximum pressure of fluid is obtained in chamber 79 of the relay valve device 39, this being due to the fact that a maximum service application is of substantially the same degree as an emergency application for the car when empty, but the closing of the check valve 244 under this service condition is not detrimental.

After the car is brought to a stop the opening of the car door 258 for effecting discharge or loading of patrons will cause energization of the magnet 253 of the reset magnet valve device 47 and thereby operation of the variable load valve device 46 to effect adjustment thereof according to any change in load of the vehicle as previously described. The closing of the car door 258 and consequent deenergization of magnet 253 of the reset magnet device 47 will then cause locking of the variable load device 46 in its newly adjusted position, as hereinbefore described.

In effecting an electro-pneumatic straight-air application of brakes as above described, as well as in effecting a purely pneumatic application as will be subsequently described, at which time the pressure of fluid in the feed valve pipe 12 may drop slightly as fluid under pressure is taken therefrom for supply to the straight-air pipe 2 etc., the check valve 383 in the brake valve device prevents flow of fluid under pressure from the brake pipe 2 to the feed valve pipe 12 thereby preventing a reduction in brake pipe pressure such as might cause undesired operation of the emergency valve device 44 to effect an emergency application of brakes, as will be later described. In other words, the closed check valve 383 insures that the emergency valve device will remain in its normal position in which it is shown in the drawing when braking the car dynamically and by straight-air.

*Release of an electro-pneumatic straight-air application of brakes*

In order to release an electro-pneumatic straight-air application of brakes, effected as above described, the operator will move the handle 268 back to the running position in which the supply of electric current to the dynamic brake wire 8 will be cut off and the magnet coil 431 of the lockout relay device 33 will become deenergized to break the dynamic brake circuit. This movement of handle 268 to run position will also effect operation of the self-lapping straight-air control valve device 280 to release fluid under pressure from diaphragm chamber 334 of the master switch device 283 and permit operation of said switch device by pressure of fluid from the straight-air pipe in chamber 333 to effect deenergization of magnet 86 of the application magnet device 40, if not already deenergized, and energization of the magnet 92 of the release magnet valve device 41. Energization of the latter magnet will open valve 88 for thereby releasing fluid under pressure from the straight-air pipe 3 and hence from chamber 79 in the relay valve device 39 by way of the variable load device 46, past the upper end of the double check valve 190 and thence past the unseated valve 127 in the lockout magnet device 43. This release of fluid under pressure from chamber 79 in the relay valve device 39 will in turn cause operation of said device to release fluid under pressure from the brake cylinder device 22 for thereby releasing the brakes on the car to permit movement thereof.

Since the degree of dynamic brake application and subsequently of pneumatic application of brakes is proportional to pressure of fluid in the straight-air pipe 3, it will be apparent that the degree of retardation of the car may be either increased or decreased in such steps as desired by proper positioning of the brake valve handle 268 between the running and full service positions for correspondingly varying the pressure of fluid in the straight-air pipe 3 as above described.

*Pneumatic service application of brakes and release thereof*

Now assuming that due to some electrical failure, such as failure of the application or release train wires 5 or 4 or of the supply of electric current to the current supply train wire 9, it is impossible to effect a service application of brakes on the car electro-pneumatically as above described, the operator may still effect a straight-air application and release of brakes on the car on the purely pneumatic principle as follows.

To effect a pneumatic straight-air application of brakes the brake valve handle 268 will be operated in the same manner as before described and the fluid under pressure supplied by the self-lapping straight-air application control valve device 280 to chamber 301 will, when it is increased to a degree sufficient to unseat check valve 356 against spring 361, flow past the open cut-off valve 313 and past said check valve to the straight-air pipe 3. If current is present in the supply wire 9 and the dynamic brake operates as above described, the inshot valve device 42 will also operate as previously described to limit the pressure of fluid provided in chamber 29 of the relay valve device 39 and thereby in the brake cylinder device 2 down to the chosen low speed of the car at which time the lockout magnet device 43 will become deenergized to permit supply of fluid to chamber 79 in the relay valve device 39 at the same pressure as acting in the straight-air pipe 3 for thereby applying the brakes on the vehicle pneumatically. If the dynamic brake is not operative then all braking of the car will be effected pneumatically past the open valve 127 in the lockout magnet device 43.

It will be seen in Fig. 4 that the sloping surface 285a on cam 285 extends past the full service position of handle 268 slightly in the direction of emergency position and the purpose of this is to cause such displacement of plunger 297 upon movement of handle 268 slightly past full service position that the supply valve 300 will remain open and permit equalization of fluid under pressure from the feed valve pipe 12 into the straight-air pipe 3, if necessary, to obtain a desired rate of retardation of the car when the dynamic brake is ineffective.

In order to release a pneumatic straight-air application of brakes affected as just described, the brake valve handle 268 may be returned to release position in which the straight-air release valve 321 will be opened to release fluid under pressure from the straight-air pipe 11 directly to atmosphere through chamber 326 in the brake valve device.

The communication including check valve 356 thus provides for applying the brakes on the car in case of failure of the electric control apparatus, while the straight-air release valve 321 provides a means for quickly releasing such an application. If desired, however, a release of such an application at a slower rate can be effected by merely moving the brake valve handle 268 to running position under which condition the release will occur from the straight-air pipe 3 past the check valve 355, through passage 315 and thence past the open cut-off valve 313 and the open release valve 303 in the self-lapping straight-air control valve device 280.

The degree of brake application on the car will vary in proportion to the pressure of fluid in the straight-air pipe 3 which in turn may be varied by proper positioning of the handle 268 between running and full service positions as before described. It is desired to point out however that if handle 268 is moved a certain distance toward running position for effecting a limited reduction in pressure in the straight-air pipe 3 and thereby a corresponding reduction in the degree of brake application, the fluid under pressure will be vented from the straight-air pipe past the "limp in" check valve 355 and thence through the self-lapping control valve device 280.

The running position of the brake valve handle 268 is provided primarily for use in releasing an electro-pneumatic application of brakes, as above described but, if desired, the release position could be used as now will be evident.

*Emergency application of brakes*

If the operator desires to effect an emergency application of brakes on the car he will move the brake valve handle 268 from either release or running position, whichever it may be occupying at the time, to emergency position in which cam 292 permits closing of the emergency application release valve 376 for cutting off supply of fluid under pressure from the feed valve passage 299 to the brake pipe 2. At the same time cam 291 will act through stem 374 to unseat the pilot valve 372 in the emergency valve device 288 for releasing fluid under pressure from chamber 368 to reduce the seating pressure on the valve piston 364, following which further movement of stem 374 will engage said valve piston and unseat it, whereupon fluid under pressure will be suddenly vented from the brake pipe 2 to atmosphere by way of chamber 366 and vent port 367.

In response to this sudden emergency reduction in pressure in the brake pipe 2 spring 423 will actuate the piston 421 in the emergency contactor device 31 to open the circuit between the dynamic brake train wire 8 and the lockout relay device 33 for rendering the dynamic brake ineffective, to also disconnect wire 94 from the release magnet valve device 41 from the wires 7 and 7a leading to the brake valve devices 23, 23a, and for connecting the application train wire 5 to wire 273 connected through the contact portion 265 of the brake valve device at the control end of the car to the electric train wire 9. The magnet 86 of the application magnet valve device 40 will thereby be energized to open its valve 81 for permitting flow of fluid under pressure from the feed valve passage 50 to the straight-air passage 85 and thence to the straight-air pipe 3, as well as past the unseated valve 127 in the deenergized lockout magnet valve device 43 to passage 125 leading to the upper end of the double check valve 190.

At the same time as fluid under pressure is thus supplied to the straight-air pipe 3 the emergency reduction in pressure in the brake pipe 2 effective in piston chamber 136 of the emergency valve device 44 will reduce the pressure therein at a rate sufficiently faster than pressure in valve chamber 139 can reduce by back flow through choke 172 to the brake pipe, that a sufficient differential in pressures will be obtained on the emergency piston 135 to move it and the slide valves 142 and 143 to their emergency position defined by contact with gasket 441. It will be noted that at the same time as the pressure of fluid in the emergency piston chamber 136 is reducing there will be flow thereto from the feed valve device 38 through cavity 448 in the main slide valve 142 until it moves out of release position, but the choke 447 so limits this flow as to ensure the reduction required in piston chamber 136 to move the piston and slide valves to their emergency position.

In emergency position of the main slide valve 142 passage 171 will be open past the left-hand end of the main slide valve 142 directly to the emergency valve chamber 139, whereupon fluid under pressure from said chamber and from the quick-action chamber 141 will flow through said passage and past check valve 168 to passage 162 leading to the vent valve piston chamber 161. The vent valve piston 160 will be operated by the fluid under pressure thus supplied to chamber 161 to open the vent valve 155 for locally venting fluid under pressure from the brake pipe 2 by way of passage 158 and past said valve to the atmospheric chamber 157 for thereby, in case of a train, propagating quick emergency action through the train. Fluid under pressure supplied to chamber 161 is gradually dissipated to atmosphere through choke 167 and such supply will be continued to hold the vent valve 155 open until the pressure of fluid in the emergency valve chamber 139 and in the quick action chamber 141 becomes reduced to the chosen low degree of 35 pounds at which time spring 169 will seat the valve 168 to prevent further release of fluid under pressure from said chambers in order to insure that the parts of the emergency valve device will remain in their emergency position until it is subsequently desired to effect a release of the brakes. After closing of valve 168 the fluid under pressure in the vent valve piston chamber 161 will be gradually dissipated to atmosphere through choke 167 to permit the vent valve 155 to be reseated by spring 164.

In order to even further assure that the emergency valve device will remain in emergency position until it is later intended to effect a release of the brakes, the brake pipe 2 is connected by way of passage 158a through the port 444 in the main slide valve 142 to the atmospheric vent passage 446 to thereby insure that the brake pipe will remain at atmospheric pressure, even after closing of the vent valve 155 and in case of leakage of fluid under pressure thereto, the choke 445 in port 442 being provided however to so limit release of fluid under pressure from the brake pipe upon subsequent supply of fluid under pressure thereto to such a rate as to insure recharging of the brake pipe and of the emergency piston chamber 136 for moving the parts to their brake release position when it is subsequently desired to release the brakes or in initial charging of the brake equipment, as hereinbefore described.

In emergency position of the main slide valve 142 passage 153 connected to the supply reservoir 26 is open by way of cavity 442 to passage 191 leading to the lower face of the double check valve 190. In effecting an emergency application of brakes, the double check valve 190 will be thus subjected on one end to fluid under pressure supplied by the application magnet valve device 90 and on the opposite end to fluid under pressure supplied by the emergency valve device 44 and whichever predominates will shift the double check valve 190 against the lower pressure and flow through passage 192 to the variable load device 46 and initially past the by-pass valve 244 therein to passage 239 and thence to piston chamber 79 of the relay valve device 39. When the pressure of fluid thus obtained in chamber 238 of the by-pass valve device is increased to a degree sufficient to overcome the opposing force of spring 241 on piston 237 said piston will move against said spring to permit closing of the valve 244 whereupon further flow of fluid under pressure from passage 246 to the relay valve device 39 will occur past the valve 199 to passage 239. Fluid under pressure will thus continue to be supplied to the relay valve device 39 until the pressure obtained past valve 199 in chamber 200 on one side of diaphragm 201 is increased to a degree sufficient to overcome the opposing force of the load adjusted regulating spring 203 whereupon said spring will yield to permit closing of valve 199 by spring 202 for thereby limiting the pressure fluid obtained in chamber 79 of the relay valve device in accordance with the adjustment of regulating spring 203 and thereby in accordance with the load on the car. The pressure of fluid thus obtained in chamber 79 of the relay device 39 will actuate said device to supply fluid at a corresponding pressure to the brake cylinder device 2 for thereby applying the brakes on the car in emergency and to a degree corresponding to the load on the car for promptly bringing the car to a stop.

In case of failure of the supply of fluid under pressure on the car, due for instance to failure of the air compressor or a broken supply pipe 36, it will be noted that the check valve 51 will hold the fluid under pressure in the supply reservoir 26 for applying brakes upon emergency operation of the emergency valve device 44, as just described.

In effecting an emergency application of brakes by operation of the operator's brake valve handle 268 it will be noted that the energization of magnet 86 of the application magnet valve device 40, as effected by the emergency contactor device 31, is independent of the master switch device 283, and as a consequence the pressure of fluid obtained in the straight-air pipe 3 will become equal to that supplied by the feed valve device 38. With the brake valve handle 268 in emergency position the cut-off valve 313 will be seated for disconnecting the straight-air pipe 3 from chambers 301 and 296 in the self-lapping straight-air application control valve device 280 so as to prevent deflection of diaphragm 294 by this pressure against spring 310 which would open the release valve 303 and dissipate such pressure to atmosphere.

In emergency position of the brake valve handle 268 the quick release valve 321 is also closed to prevent release of fluid under pressure from the straight-air pipe. The suppression valve 386 is also closed under this condition but this is immaterial. Fluid under pressure from the straight-air pipe 3 will also be effective in diaphragm chamber 333 of the master switch device 282 while fluid at the pressure supplied by the self-lapping straight-air control valve device 280 will be present in chamber 334 whereby the diaphragm 332 will be operated by the higher pressure present at chamber 333 to move the movable contact 340 into contact with the release contact 343 for connecting the electric train wire 9 to wire 7 or 7a leading to the emergency contactor device 31, but this is without avail since the contactor device 31 is in position disconnecting the release magnet wire 94 from the wires 7, 7a.

*Safety control emergency and suppression thereof*

When the brake valve handle 286 is in release position, running position, or in any position between running and full service positions short of that providing an application of brakes on the car adequate to insure the safety thereof, the suppression valve 386 will be unseated for connecting passage 402 from chamber 407 of the vent valve device 278 to passage 309 open to the safety control handle device 19. When the suppression valve 386 is thus open, if the operator should unintentionally or otherwise remove pressure on handle 400 of the safety controller handle device 19, spring 399 will actuate lever 396 to open the valve 393. The opening of valve 393 will release fluid under pressure from chamber 407 in the vent valve device 278 at a rate so exceeding the rate of supply to said chamber through the restricted port 408 as to permit brake pipe pressure acting on the lower face of valve piston 404 to move said valve piston against the spring 409 for thereby opening the brake pipe 2 to atmosphere through the vent port 406. Fluid under pressure will thereby be suddenly vented from the brake pipe 2 and the emergency contactor 31 and the emergency valve device 44 will operate in response thereto to effect an emergency application of brakes on the car either by the consequent energization of the application magnet 40 or operation of the emergency valve device, as above described. If at this time the brake valve handle 268 should happen to be in release or running position the fluid under pressure supplied to the straight-air pipe 2 will however be vented to atmosphere past the quick release valve device 321 in the release position of the brake valve handle 268, or past the check valve 355 to passage 315 thence past the open cutoff valve 313 and the open release valve 303 in the self-lapping straight-air control valve device 280 so that the emergency application will occur as a result of operation of the emergency valve device 44. In case the brake valve handle is in some position between the running and full service positions in which the suppression valve 386 is open the diaphragm 294 in the straight-air control valve device 280 when subjected in chamber 296 to a pressure from the straight-air pipe higher than that for which said device is adjusted by cam 285 will operate to release fluid under pressure from the straight-air pipe 3 in order to prevent an increase in such pressure to a degree above such adjustment. In case the position of the brake valve handle is not changed there will therefore be a constant flow to atmosphere of fluid under pressure from the straight-air pipe 3, but this will not effect the emergency application of brakes on the car and the stopping thereof since the fluid employed for such application is bottled in the supply reservoir 26 by the check valve 51.

When an emergency application of brakes is effected by release of the safety control handle 400 the operator may however move the brake valve handle 268 to emergency position for effecting closing of the cut-off valve device 313 under which condition the pressure of fluid in the straight-air pipe 3 will be prevented from being dissipated and will build up to that provided by the feed valve device 38. At the same time the pressure of fluid in the supply reservoir 26 will build up to the same degree past the ball check valve 51 and the relay valve device 39 will be maintained in its application position by fluid under pressure from said reservoir.

If the brake valve handle 268 is in a position between running and full service positions providing an application of brakes adequate to insure the safety of the car, such as 35 pounds in the straight-air pipe 3 and thereby in the brake cylinder device 23, the cam 293 will be positioned to permit closing of the suppression valve 386 by spring 391 under which condition the safety control handle 400 may be released without effecting an emergency application of brakes as above described.

*Conductor's valve emergency*

If when the brakes on the car are released the conductor desires to bring the car to a stop he will operate lever 419 of either conductor's valve device 24 or 24a to vent fluid under pressure from chamber 407 of the respective vent valve device 278 whereupon said vent valve device will operate to vent fluid under pressure from the brake pipe 2 to cause an emergency application of brakes on the car in the same manner as occurs upon release of the safety control handle 400 as above described.

*Trip valve emergency*

Likewise, if either trip valve device 27 or 27a is operated, a sudden emergency venting of fluid under pressures from the brake pipe 2 will occur by way of the respective check valve 28 or 28a and thereby cause an emergency application of brakes to be effected. The check valves 28, 28a are provided to isolate the pipes connecting same to the brake pipe 2 so that in effecting an emergency application of brakes other than by the trip valve devices the fluid under pressure in said pipes will not have to be vented which otherwise would retard to some extent dissipating the fluid under pressure from the brake pipe and obtaining the emergency application, and, in the case of a train, would slow down the propagation of emergency action from one emergency valve device 44 to the next through the train.

*Release of an emergency application of brakes*

When it is desired to effect a release of an emergency application of brakes on the car, assuming that the conductor's valves 24 and 24a are closed and that handle 400 of the safety controller device 19 is depressed, the operator will return handle 268 of the respective brake valve device 23 or 23a to its full service position for opening the emergency application release valve 376. Upon opening valve 376 fluid at the pressure supplied by the feed valve device to the feed valve pipe 12 will flow past said valve to the brake pipe 2 and thence to piston chamber 136 in the emergency valve device 44. When the pressure of fluid in chamber 136 is thus increased sufficiently to overcome the retained pressure acting in valve chamber 139, the emergency piston 135 and slide valves 142 and 143 will be returned to their release position for reestablishing the brake pipe charging communication from the feed valve passage 50 to the brake pipe 2 by way of cavity 448 in said main slide valve, and for opening to atmosphere passage 191 from the double check valve device 80 by way of cavity 443 in the main slide valve 142 and passage 446, whereupon the fluid under pressure will be released from the lower end of the double check valve. The magnet 86 of the application magnet valve device 40 will however remain energized to maintain the brakes on the car applied until the brake pipe pressure is increased to a degree sufficient to operate the emergency contactor device 31 from the position in which it is shown in the drawing to the position for breaking the connection between wire 273 and the application train wire 5 and for connecting wire 94 from the release magnet valve device 41 to wires 7 and 7a leading to the two brake valve devices 24, 24a respectively.

In full service position of the operator's brake valve handle 268 the self-lapping straight-air control valve device 380 will be providing in diaphragm chamber 334 fluid at maximum service pressure such as 67 pounds, while at the time the application magnet 86 is reconnected to the application train wire 5 by operation of the emergency contactor device, the pressure of fluid in the straight-air pipe 3 and thereby in diaphragm chamber 333 of the master switch device 283 may be so in excess so that in chamber 334 that the diaphragm 332 will be in the position shown connecting wire 274 to wire 7 or 7a. As a result, upon operation of the emergency contactor device 31 in response to charging of the brake pipe 2 the magnet 92 of the release magnet valve device 41 will become energized for opening the valve 88 for releasing fluid under pressure from the straight-air pipe 85. Fluid under pressure will thus be released from the straight-air pipe 3 and from diaphragm chamber 333 in the master switch device 283 until it becomes to reduced with respect to the opposing pressure in chamber 334 that the latter pressure will deflect the diaphragm against spring 350 for opening the circuit to the magnet 92 of the release magnet valve device 41. Deenergization of the magnet 92 of the release magnet valve device 41 will than permit closing of valve 88 by spring 93 for preventing further release of fluid under pressure from the straight-air pipe 3.

It will not noted that when the emergency valve device 44 moves to its normal or lease position and opens passage 191 to atmosphere the brakes on the car will be held applied by pressure of fluid from passage 125 supplied with fluid under pressure from the straight-air pipe 3, so that upon operation of the master switch device 283, as just described, the pressure of fluid in passage 125 will be reduced to the full service setting of the self-lapping straight-air control valve device 280, and in case the pressure of fluid in chamber 79 of the relay valve device 39, as governed by the variable load device 46, is in excess, it will reduce by back flow past the by-pass valve 244 in the variable load device to the same pressure as acting in passage 125.

After the emergency valve device 44 is returned to its release position, the operator may return the brake valve handle 286 to either its release or running position either before or after operation of the emergency actuator 31, whereupon a complete release of fluid under pressure from piston chamber 79 in the relay valve device 39, and thereby from the brake cylinder device 22, will occur for effecting a complete release of brakes on the vehicle in the same manner as above described in connection with initial charging of the equipment.

Further, in connection with the emergency application release valve 376 which must be opened in order to quickly effect a release of brakes following an emergency application or upon initial charging as above described, it will be noted that this valve is open only in the full service position for charging the brake pipe 2 until sufficient pressure is obtained therein to move the emergency valve device 44 to release position. The closing of valve 376 in emergency position of handle 268 prevents loss of fluid under pressure from the feed valve pipe 12 to the vented brake pipe 2, while in release, running and all service positions less than the full service position, the closing of valve 276 limits the supply of fluid under pressure to the brake pipe to the flow capacity of choke 447 so as to ensure prompt and positive emergency venting of fluid under pressure from the brake pipe, and thereby an emergency application of brakes, in case of operation of the conductor's valve device 24 or 24a, the trip valve device 27 or 27a, or of the vent valve piston 434.

The main slide valve 142 of the emergency valve device 44 is provided with a port 451 which in the normal position of said valve connects passage 446 to the seating face of the auxiliary slide valve 143 and the latter slide valve when in a position determined by engagement of plunger 148 with the main slide valve establishes a communication between said port and a port 452 in the auxiliary slide valve which opens to the valve chamber 139. While the brake pipe 2 is being maintained charged with fluid under pressure by way of cavity 448 in the main slide valve 142, the valve chamber 139 and quick action chamber 141 will become charged by operation of the feed valve device 38 with fluid at the maximum pressure obtained in piston chamber 136. Feed valve devices usually operate on a certain limited range, so that after a maximum pressure of fluid is obtained in the valve chamber 139 the pressure in the brake pipe 2 and piston chamber 136 may reduce slightly and create a differential in pressures on the emergency piston 135 which will cause operation thereof to move the auxiliary slide valve 143. After a certain slight movement of the auxiliary slide valve the port 452 will register with the port 451 for thereby releasing fluid from chamber 139 and the quick action chamber 141 to reduce the pressure therein so as to stop movement of the piston 135 and thereby prevent an undesired emergency application of brakes. Fluid under pressure will thus be released from the valve chamber 139 and quick action chamber 141 until the pressure therein is reduced sufficiently below the opposing pressure in chamber 136 acting on piston 135 to actuate said piston and the auxiliary slide valve 143 back to their normal position. In other words, the ports 452 and 451 constitutes breather ports for dissipating excess fluid under pressure from valve chamber 139 and quick action chamber 141 to prevent unintentional emergency operation of the emergency valve device.

The main emergency slide valve 142 is also provided with a port 453 adapted to be uncovered by the auxiliary slide valve 143 after registration of ports 452 and 451 and movement of said valve sufficient to move plunger 148 against spring 147, so that in effecting an emergency application of brakes some fluid under pressure will be obtained from valve chamber 139 and quick action chamber 141 in passage 171 before the main slide valve 142 is moved to open said passage past the left-hand end thereof to the emergency valve chamber 139, the purpose of this being to obtain quicker operation of the vent valve piston 160 than would otherwise result.

*Conditioning of equipment upon parking car*

When a car is parked, as in the car barns, the operator will remove the handle 268 and take it with him, and the act of moving the handle through emergency position to handle-off position will cause an emergency application of the brakes on the car as above described. Due to this the parts of the equipment will assume their emergency position, and the conditioning of the brake equipment will then be as above described under releasing of an emergency application of brakes, or under initial charging of the equipment if in the meantime the fluid under pressure is completely released from the brake equipment.

*Train operation*

When a number of cars, each provided with the present equipment, are operated in a train, the brake equipments thereon, as controlled through the medium of the interconnecting straight-air pipe 3, brake pipe 2, application wire 5, release wire 7, dynamic brake wire 8 and battery supply wire 9, will all operate in the same manner as above described, in response to operation of the brake valve device 23 or 23a at the head end of the leading car at the selected end of the train, either in unison in electro-pneumatic straight-air operation, or serially in pneumatic straight-air operation or a combination of both in emergency operation.

Initial charging of a train may be effective in the same manner as above described for a single car, it being noted that the compressor on each car will charge the respective equipment (since the feed valve pipe 12 is not connected between cars) up to the pressure when valve 179 in the charging valve device 45 closes, following which the brake pipe on all cars will be charged with fluid under pressure by the compressor on the leading car through the brake valve device on the leading car with the handle 268 of said brake valve device in full service position. As soon as the emergency valve devices 44 move to release position however, the compressor on each car will charge and maintain the pressure of fluid in the brake pipe 2 through cavity 448 and choke 447 in the respective emergency valve device. It will be further noted that the fluid under pressure for controlling the relay valve devices 39 and applying the brakes on each car will be provided by the respective compressor, the choke 447 minimizing flow of fluid under pressure from one car to another and substantially equalizing the work done by the compressors on different cars.

In case the supply of fluid under pressure on a car fails, as if the compressor failed to operate, upon initial charging or while a train is in operation, the load thereof will be taken over by the other compressors with no possible failure of brakes on the train.

If the compressor fails on a car while the train is in operation the brake equipment on said car will be maintained charged with fluid under pressure delivered by the compressors on the other cars via the brake pipe 2, thence through the respective choke 447 and cavity 448 in the main emergency slide valve 142 to the feed valve passage 50 from which the main reservoir 25 will be charged by reverse flow through the feed valve device 38 and the supply reservoir 26 will be charged past the ball check valve 51.

If upon initial charging the compressor on a car fails to start, movement of the operator's brake valve handle 268 to full service position will energize the application magnets 86 through the train and thereby open the application magnet valves 81 whereupon fluid under pressure supplied to the feed valve passages 50 on the cars on which the compressors are operating will flow to the straight-air pipe 3 as hereinbefore described. On any car on which the compressor is not operating fluid under pressure will then flow from the straight-air pipe 3 through choke 84 and past the open application magnet valve 81 thereon to the feed valve passage 50 for charging the main reservoir 25 and supply reservoir 26 and other parts of the equipment and to permit operation thereof the same as in initial charging. To accelerate such charging the check valve device 48 may even be employed, the check valves 260 of which will open upon charging of the straight-air pipe to permit flow of fluid under pressure therefrom to the feed valve passage 50 for charging the equipment. After the equipment is charged to the pressure thus provided in the straight-air pipe the check valves 260 will close, one under the action of gravity and the other under the action of spring 261 to hold the fluid pressure in the equipment upon release of fluid under pressure from the straight-air pipe 3.

If it happens to be the lead car of the train on which the compressor fails to operate, then with the brake valve handle 268 in full service position, the brake pipe 2 will become charged with fluid under pressure supplied from the straight-air pipe to the feed valve pipe 12 thereon, as just described, until the emergency valve devices 44 thereon and through the train move to release position following which the brake pipe will be maintained charged by way of cavities 448 in the emergency valve devices as hereinbefore described. Following an emergency application of brakes the fluid under pressure retained in the main reservoir 25 on the leading car on which the compressor is not operating will normally be adequate for recharging the brake pipe as required to cause the emergency valve devices 44 to move to their release position, but if inadequate, the equipment will be recharged to sufficient pressure by way of the open application magnet valve 81 and the check valve device 48 with the brake valve handle in full service position to accomplish such release.

It will be noted that the release wire 7, 7a is not continuous through the train but on each car is adapted to be broken by the emergency contactor device 31 in response to an emergency reduction in brake pipe pressure, the purpose being to effect deenergization of the magnet 92 of all release magnet valve devices 41 and thereby closing of the respective release valves 88 in the train simultaneous with energization of magnets 86 of the application magnet devices 40 and opening of the application valves 81 to supply fluid under pressure to the straight-air pipe 3 in case of an emergency reduction in brake pipe pressure initiated other than by movement of the operator's control handle 268 to emergency position which otherwise would effect the same result. Thus if an emergency application of brakes on a train is initiated, for example, by relief of handle 400 of the safety control handle device 19 all release magnets 92 will be deenergized at the same time as the application magnets 86 are energized, so as to prevent any loss of fluid under pressure supplied in response to energization of the latter magnets for applying the brakes on the train, which would otherwise occur with the brake valve handle 268 in release or running position supplying electric current to the train wire 7 or 7a if the wires 7, 7a were connected to each other and were continuous through the train, and deenergization of the release magnets 92 were dependent upon the serial operation of the emergency valve devices 44 and thereby of the emergency contactor devices 31 throughout the train in response to an emergency reduction in brake pipe pressure effected at any given point in the train.

*Summary*

It will now be seen that we have provided a brake equipment for use on individual cars or on a train of such cars which insures against movement of the car or train until after the equipment has been charged with fluid at a pressure adequate to insure the safety thereof and until after the fluid pressure brakes have been applied and released to insure their operation, as intended. Dynamic braking governed by pressure of fluid in the straight-air pipe is employed for use in normal service braking of the car, and during such braking, air braking may be superimposed on the dynamic brake if necessary to obtain a desired rate of deceleration as selected by the operator, the air brake also becoming effective automatically upon fading out of the dynamic brake in order to bring the car or train to a stop. The service braking is normally on the electropneumatic principle but in case of failure thereof may be purely pneumatic. In emergency the degree of braking is limited according to the load on the car and such braking may be initiated by the operator moving the brake valve handle to emergency position, by operation of the conductor's valve device, by the safety control handle 400 upon failure of the operator to hold it depressed, by operation of either trip valve 27 or 27a or by even a rupture of the brake pipe. The equipment embodies structure which insures a maximum degree of safety for the car but which at the same time provides for a rapid application and release of brakes on the car to facilitate operation on a fast operating schedule.

Having now described the invention, what we claim as new and desire to secure by Letters Patent, is:

1. A vehicle brake equipment comprising in combination, a brake pipe, an emergency valve device operable upon a reduction in brake pipe pressure to an emergency position for effecting an application of brakes and operable upon supply of fluid under pressure to said brake pipe to a normal position for opening a fluid pressure supply communication to said brake pipe which communication is closed in said emergency position, and an operator's brake valve device having a brake application position and a position for releasing an application of brakes, and comprising means operable in said brake application position to effect a supply of fluid under pressure to said brake pipe and operable in said position for releasing an application of brakes to effect closing off of said supply of fluid under pressure to said brake pipe.

2. A vehicle brake equipment comprising in combination, a brake pipe, an emergency valve device operable upon a reduction in pressure of fluid in said brake pipe to an emergency position and upon supply of fluid under pressure to said brake pipe to a normal position and comprising means operable in said emergency position for effecting an application of brakes and for opening said brake pipe to atmosphere and operable in said normal position to close the atmospheric connection to said brake pipe and for supplying fluid under pressure to said brake pipe, and an operator's brake valve device having a brake application position for supplying fluid under pressure to said brake pipe and a brake release position for closing the respective brake pipe supply communication to said brake pipe.

3. A vehicle brake equipment comprising in combination, a brake pipe, an emergency valve device operable upon a reduction in pressure of fluid in said brake pipe to an emergency position and upon supply of fluid under pressure to said brake pipe to a normal position and comprising means operable in said emergency position for effecting an application of brakes and for opening said brake pipe to atmosphere and operable in said normal position to close the atmospheric connection to said brake pipe and for supplying fluid under pressure to said brake pipe, an operator's brake valve device having a brake application position for supplying fluid under pressure to said brake pipe and a brake release position for closing the respective brake pipe supply communication to said brake pipe, and means other than said emergency valve device operable in said brake application position to effect an application of brakes and in said brake release position for effecting a release of said brakes.

4. A vehicle brake equipment comprising in combination, a brake pipe, an emergency valve device operable upon a reduction in brake pipe pressure to an emergency position for effecting an application of brakes and operable upon supply of fluid under pressure to said brake pipe to a normal position for opening a fluid pressure supply communication to said brake pipe which communication is closed in said emergency position, and an operator's brake valve device comprising a control handle having a position for releasing an application of brakes and a full application spaced from the brake release position, self-lapping valve means operable by said handle to supply fluid for applying brakes on said vehicle at a pressure proportional to the distance of said handle from said brake release position and operable to release such fluid in said brake release position for releasing said brakes, and means operable by said handle in said full application position for opening a brake pipe charging communication to said brake pipe and for closing said communication in all other positions of said handle.

5. A vehicle brake equipment comprising in combination, a brake pipe, an emergency valve device operable upon a reduction in brake pipe pressure to an emergency position for effecting an application of brakes and operable upon supply of fluid under pressure to said brake pipe to a normal position for opening a fluid pressure supply communication to said brake pipe which communication is closed in said emergency position, and an operator's brake valve device comprising a handle having a position for releasing an application of brakes, a full application position spaced from the brake release position and an emergency position at the side of said application position opposite said brake release position, said brake valve device further comprising self-lapping valve means operable by said handle upon movement thereof from said brake release position toward said full application position to supply fluid for applying brakes at a pressure proportional to the extent of such movement and operable in said brake release position to release such fluid under pressure, means operable by said handle in said full application position to open a fluid pressure supply communication to said brake pipe and in all other positions of said handle to close such communication, and means operable by said handle in said emergency position to effect a reduction in pressure in said brake pipe.

6. A vehicle brake equipment comprising in combination, a brake pipe, valve means operable upon a reduction in pressure of fluid in said brake pipe to a brake application position for effecting an application of brakes and operable upon an increase in brake pipe pressure to a normal position for releasing a brake application and for establishing a restricted fluid pressure supply communication to said brake pipe which is closed in said brake application position, and operator's brake valve handle having a position for releasing brakes and a position for applying brakes, and means operable by said handle in the brake applying position to open a fluid pressure supply communication to said brake pipe and in the brake release position to close said communication.

7. A vehicle brake equipment comprising in combination, a brake pipe, an emergency valve device operable upon a reduction in brake pipe pressure to an emergency position and upon supply of fluid under pressure to said brake pipe to a normal position and comprising means operable in said emergency position for opening said brake pipe to atmosphere and for supplying fluid under pressure to a brake application communication and operable in said normal position to close the atmospheric connection to said brake pipe and to release fluid under pressure from said communication, a brake valve device having a brake application position and a brake release position and comprising means operable in said brake application position for supplying fluid under pressure to said brake pipe and for effecting a supply of fluid under pressure to another brake application communication and operable in said brake release position for cutting off supply of fluid under pressure to said brake pipe and to said other communication, brake control means operable by fluid under pressure to effect an application of brakes, and means connecting said brake control means to both of said communications including a double check valve subject to pressure of fluid in the two communications for opening said brake control means to the communication at higher pressure and for disconnecting said brake control means for the communication at lower pressure.

8. A vehicle brake equipment comprising in combination, a brake pipe, a straight-air pipe, a brake valve control handle having a brake application position and a brake releasing position, means operable upon movement of said handle to said brake application position to supply fluid under pressure to said brake pipe and to said straight-air pipe and operable in said brake release position to cut off supply of fluid under pressure to said brake pipe and to release fluid under pressure from said straight-air pipe, an emergency valve device operable upon an emergency reduction in brake pipe pressure to a brake applying position for supplying fluid under pressure to a communication and for establishing a restricted opening from said brake pipe to atmosphere and operable upon an increase in brake pipe pressure to a normal position for opening said communication to atmosphere and for closing said restricted opening and establishing a fluid pressure supply opening to said brake pipe, means for effecting an emergency reduction in pressure in said brake pipe, brake cylinder means, and means including a double check valve subject opposingly to pressures in said straight-air pipe and said communication for connecting same to said brake cylinder means.

9. In a fluid pressure brake equipment, in combination, a brake pipe, emergency valve means subject opposingly to pressures of fluid in said brake pipe and in a quick action chamber and operable upon a preponderance of pressure in said quick action chamber to a brake applying position and upon a preponderance in brake pipe pressure to a brake release position, charging valve means constantly effective to supply fluid at a chosen pressure to said quick action chamber, means for venting fluid under pressure from said brake pipe for establishing said preponderance in quick action chamber pressure, means for supplying fluid to said brake pipe at a pressure higher than supplied by said charging valve means, and means effective in said brake release position of said emergency valve means for establishing a restricted communication between said brake pipe and quick action chamber which communication is closed in said brake application position.

10. In a fluid pressure brake equipment, in combination, a brake pipe, emergency valve means subject opposingly to pressures of fluid in said brake pipe and in a quick action chamber and operable upon a preponderance of pressure in said quick action chamber to a brake applying position and upon a preponderance in brake pipe pressure to a brake release position, said emergency valve means comprising means for, in said brake application position, establishing a restricted fluid pressure vent from said brake pipe and another vent from said quick action chamber, which vents are closed in said brake release position, means for limiting reduction in pressure in said quick action chamber by way of said other vent to a chosen reduced pressure, charging valve means constantly effective to supply fluid to said quick action chamber at said chosen reduced pressure, means for venting fluid under pressure from said brake pipe to establish said preponderance in quick action chamber pressure, means for supplying fluid under pressure to said brake pipe to establish said preponderance in brake pipe pressure, and means effective in said brake release position for opening a restricted charging communication from said brake pipe to said quick action chamber which communication is closed in said brake applying position.

11. In a fluid pressure brake equipment, in combination, a brake pipe, a source of fluid under pressure, emergency valve means comprising vent valve means operable by fluid under pressure to open a fluid pressure vent from said brake pipe and upon release of fluid under pressure to close said vent, and other means controlled by opposing pressures of fluid in said brake pipe and a quick action chamber and operable upon a preponderance of pressure in said quick action chamber to a brake application position for establishing a fluid pressure supply communication from said quick action chamber to said vent valve means and operable upon a preponderance in pressure in said brake pipe to a brake release position for closing said communication, means for limiting to a chosen degree reduction in pressure in said quick action chamber by flow through said communication to said vent valve means, means for releasing fluid under pressure from said vent valve means, charging valve means constantly effective to supply fluid to said chamber at substantially said chosen degree of pressure, means for venting fluid under pressure from said brake pipe to establish said preponderance in quick action chamber pressure, means for supplying fluid to said brake pipe to establish said preponderance in brake pipe pressure, and means effective in said brake release position to establish a restricted flow communication from said source of fluid under pressure to said brake pipe.

12. In a fluid pressure brake equipment, in combination, a brake pipe, a source of fluid under pressure, brake control means operable by fluid under pressure to apply brakes and upon release of fluid under pressure to release said brakes, emergency valve means controlled by opposing pressures of fluid in said brake pipe and in a quick action chamber and operable upon a preponderance in pressure in said quick action chamber to a brake applying position and upon a preponderance in pressure in said brake pipe to a brake release position, means for venting fluid under pressure from said brake pipe to establish said preponderance in quick action chamber pressure, said emergency valve means comprising means effective in said brake application position to supply fluid under pressure from said source to said brake control means and to open a restricted atmospheric vent from said brake pipe and effective in said brake release position to release fluid under pressure from said brake control means and to close said vent, means for releasing fluid under pressure from said quick action chamber in said brake application position, means for supplying fluid under pressure to said brake pipe for establishing said preponderance in brake pipe pressure, and means effective in said brake release position to establish a restricted fluid pressure supply communication from said brake pipe to said quick action chamber and effective in said brake application position to close said fluid pressure supply communication.

13. In a fluid pressure brake equipment in combination, a brake pipe, a source of fluid under pressure, brake control means operable by fluid under pressure to apply brakes and upon release of fluid under pressure to release said brakes, emergency valve means controlled by opposing pressures of fluid in said brake pipe and in a quick action chamber and operable upon a preponderance in pressure in said quick action chamber to a brake applying position and upon a preponderance in pressure in said brake pipe to a brake release position, means for venting fluid under pressure from said brake pipe to establish said preponderance in quick action chamber pressure, said emergency valve device comprising means effective in said brake application position to supply fluid under pressure from said source to said brake control means and to open a restricted atmospheric vent from said brake pipe, and to also open a vent from said quick action chamber, and effective in said brake release position to release fluid under pressure from said brake control means and to close both of said vents, vent valve means arranged for operation by fluid under pressure supplied to the vent from said quick action chamber, means for releasing fluid under pressure from said vent valve means, means for supplying fluid under pressure to said brake pipe for establishing sair preponderance in brake pipe pressure, and means effective in said brake release position for establishing a restricted fluid pressure supply communication from said brake pipe to said quick action chamber and effective in said brake application position to close said fluid pressure supply communication.

14. In a fluid pressure brake equipment, in combination, a brake pipe, a source of fluid under pressure, brake control means operable by fluid under pressure to apply brakes and upon release of fluid under pressure to release said brakes, emergency valve means controlled by opposing pressures of fluid in said brake pipe and in a quick action chamber and operable upon a preponderance in pressure in said quick action chamber to a brake applying position and upon a preponderance in pressure in said brake pipe to a brake release position, means for venting fluid under pressure from said brake pipe to establish said preponderance in quick action chamber pressure, said emergency valve device comprising vent valve means operable by fluid pressure to vent fluid under pressure from said brake pipe and upon release of fluid under pressure to close the brake pipe vent, and other means effective in said brake application position to supply fluid under pressure from said source to said brake control means, to open a restricted vent from said brake pipe and to establish a fluid pressure supply communication from said quick action chamber to said vent valve means and effective in said release position to release fluid under pressure from said brake control means, to close said restricted vent and to close communication between said quick action chamber and said vent valve means, valve means controlling said communication operable to close same upon a reduction in pressure in said quick action chamber to a chosen degree, means effective in said brake release position to establish a fluid pressure supply communication from said brake pipe to said quick action chamber, and means for establishing said preponderance in brake pipe pressure.

15. In a fluid pressure brake equipment, in combination, a brake pipe, a source of fluid under pressure, brake control means operable by fluid under pressure to apply brakes and upon release of fluid under pressure to release said brakes, emergency valve means controlled by opposing pressures of fluid in said brake pipe and in a quick action chamber and operable upon a preponderance in pressure in said quick action chamber to a brake applying position and upon a preponderance in pressure in said brake pipe to a brake release position, means for venting fluid under pressure from said brake pipe to establish said preponderance in quick action chamber pressure, said emergency valve device comprising vent valve means operable by fluid under pressure to vent fluid under pressure from said brake pipe and upon release of fluid under pressure to close the brake valve vent, and other means effective in said brake application position to supply fluid under pressure from said source to said brake control means, to open a restricted vent from said brake pipe and to establish a fluid pressure supply communication from said quick action chamber to said vent valve means, and effective in said release position to release fluid under pressure from said brake control means, to close said restricted vent and to close communication between said quick action chamber and said vent valve means, valve means controlling said communication operable to close same upon a reduction in pressure in said quick action chamber to a chosen degree, charging valve means constantly effective to supply fluid from said source to said quick action chamber at said chosen degree of pressure, means effective in said brake release position to establish a fluid pressure supply communication from said brake pipe to said quick action chamber, and means for establishing said preponderance in brake pipe pressure.

16. In a motor vehicle brake equipment, in combination, a main reservoir arranged to be charged with fluid under pressure, a brake pipe, an emergency valve device controlled by opposing pressures of fluid in said brake pipe and a quick action chamber and operable to a brake application position upon a preponderance in pressure in said quick action chamber over that in said brake pipe and operative to a brake release position upon a preponderance in brake pipe pressure, an operator's brake valve handle having a service application position and a brake releasing position, means operative in said service application position to supply fluid under pressure from said main reservoir to said brake pipe and operative in said brake releasing position to cut off said supply of fluid under pressure to said brake pipe, brake control means operable by said handle in said service application position to supply fluid under pressure to effect an application of brakes and operable in said brake release position to release such fluid under pressure, and means for venting fluid under pressure from said brake pipe to establish said preponderance in quick action chamber pressure.

17. In a motor vehicle brake equipment, in combination, a main reservoir arranged to be charged with fluid under pressure, a supply reservoir adapted to be charged with fluid under pressure from said main reservoir, a check valve in the charging communication between said reservoirs arranged to prevent flow of fluid under pressure from said supply reservoir to said main reservoir, a brake pipe, an emergency valve device controlled by opposing pressures of fluid in said brake pipe and a quick action chamber and operable to a brake application position upon a reduction in pressure in said brake pipe and to a brake release position upon preponderance in brake pressure over that in said quick action chamber, said emergency valve device comprising means for establishing a communication from said supply reservoir to a brake applying passage and for opening said brake pipe to atmosphere in said brake applying position and for closing communication between said supply reservoir and passage and for establishing a restricted charging communication from said main reservoir to said brake pipe in said brake release position, an operator's brake valve handle having an emergency position, a service application position and a position for releasing brakes on said vehicle, means operative in said emergency position for venting fluid under pressure from said brake pipe to effect movement of said emergency valve device to said brake application position, means operative in said service application position for supplying fluid under pressure from said main reservoir to said brake pipe for establishing said preponderance in brake pipe pressure and operative to close such communication in all other positions of said handle, brake controlling means operable upon movement of said handle to said service position to supply fluid under pressure to another passage and upon movement to said release position to release fluid under pressure from said other passage, brake control means, and means including a double check valve subject opposingly to the pressures of fluid in the two above-named passages controlling communication between said passages and said brake control means.

18. A brake system for a vehicle comprisng fluid pressure braking means, electro-dynamic braking means, an operator's control device for effecting operation of both of said braking means, means for limiting to one chosen degree the effectiveness of said fluid pressure braking means, and means for rendering said limiting means ineffective only in response to substantial ineffectiveness of said electro-dynamic braking means.

19. A brake system for a vehicle comprising fluid pressure operable braking means, means for supplying fluid under pressure to control operation of said braking means, electro-dynamic braking means, means controlled by said fluid under pressure for regulating said electro-dynamic braking means, limiting means for limiting to one fixed degree the effectiveness of said fluid pressure operable braking means, and means controlled by said electro-dynamic braking means for rendering said limiting means effective only when the effectiveness of said electro-dynamic braking means is in excess of a chosen degree and ineffective when less than said chosen degree.

20. A brake system for a vehicle comprising a control pipe, an operator's control device for varying pressure of fluid in said pipe, brake control means adapted to be operated by fluid under pressure from said pipe for effecting an application of vehicle brakes according to the pressure of such fluid, electro-dynamic braking means, an actuator operable by fluid under pressure in said pipe to vary the effectiveness of said electro-dynamic braking means in proportion to the pressure of such fluid, valve means operative upon supply of fluid under pressure to said pipe to provide a non-braking inshot of fluid under pressure to said brake control means and operative in response to pressure of fluid in said pipe which provides maximum effectiveness of said electro-dynamic braking means to supply fluid to said brake controlling means for increasing the pressure therein in accordance with further increase in pressure in said pipe, and means controlled by said electro-dynamic braking means operative to render said valve means effective above a chosen degree of effectiveness of said electro-dynamic braking means and ineffective below said chosen degree.

21. A brake system for a vehicle comprising a control pipe, an operator's control device for varying pressure of fluid in said pipe, brake control means adapted to be operated by fluid under pressure from said pipe for effecting an application of vehicle brakes according to the pressure of such fluid, electro-dynamic braking means, an actuator operable by fluid under pressure in said pipe to vary the effectiveness of said electro-dynamic braking means in proportion to the pressure of such fluid, valve means operative upon supply of fluid under pressure to said pipe to provide a non-braking inshot of fluid under pressure to said brake control means and operative in response to pressure of fluid in said pipe which provides maximum effectiveness of said electro-dynamic braking means to supply fluid to said brake controlling means for increasing the pressure therein in accordance with further increase in pressure in said pipe, and means controlled by said electro-dynamic braking means operative to open said pipe to said brake control means when the effectiveness of said electro-dynamic braking means is less than a chosen degree and to disconnect said brake control means from said pipe and open same for control to said valve means when the effectiveness of said dynamic-braking means is greater than said chosen degree.

22. A brake system for a vehicle comprising a straight-air pipe, an operator's control device for varying pressure of fluid in said pipe, brake control means arranged for operation by pressure of fluid from said pipe to effect an application of vehicle brakes in accordance with the pressure of such fluid, inshot valve means controlled by pressure of fluid in said pipe controlling a communication between said pipe and said brake control means and operative to close said communication upon an increase in pressure in said pipe to a chosen non-braking degree and operative at a chosen higher pressure in said pipe to open said communication, electro-dynamic braking means for said vehicle including an actuator adjustable by fluid under pressure in said pipe to vary the effectiveness of said electro-dynamic braking means in accordance with the pressure of fluid in said pipe up to a maximum degree at said chosen higher pressure in said pipe, and lockout means controlled by said electro-dynamic means operative with the effectiveness of said electro-dynamic braking means in excess of a chosen degree to close a communication between said brake control means and said pipe and when less than said chosen degree to open said brake control means to said pipe.

23. A brake system for a vehicle comprising a straight-air pipe, an operator's control device operable to effect a supply of fluid under pressure to and a release of fluid under pressure from said pipe, electro-dynamic braking means for the vehicle including vehicle motors arranged to operate as generators to brake said vehicle, and means operative upon supply of fluid under pressure to said straight-air pipe to render said motors effective to brake said vehicle to a degree proportional to the pressure of such fluid, fluid pressure braking means arranged to be operated by fluid under pressure from said pipe to effect braking of said vehicle in accordance with the pressure of such fluid, lockout means controlling communication between said straight-air pipe and fluid pressure braking means and adapted to be controlled in accordance with current delivered by said generators to close communication between said straight-air pipe and said fluid pressure braking means when the vehicle speed is in excess of a chosen degree and to open said communication at a lower speed, inshot valve means cooperative with said lockout means when closing said communication to supply fluid under pressure from straight-air pipe to said fluid pressure braking means and comprising means for cutting off such supply upon an increase in pressure in said fluid pressure braking means to a chosen low degree, means for rendering said inshot valve means responsive to a higher pressure of fluid in said straight-air pipe, which provides maximum effectiveness of said electro-dynamic braking means, to supply fluid under pressure to said fluid pressure braking means in proportion to the increase in pressure in said straight-air pipe in excess of said chosen higher pressure, and means associated with said brake valve device for rendering said electro-dynamic braking means operative upon operation of said brake valve device to supply fluid under pressure to said straight-air pipe and non-operative upon operation of said brake valve device to effect complete release of fluid under pressure from said straight-air pipe.

24. In a vehicle brake equipment in combination, a brake control pipe, means for supplying fluid under pressure to said pipe, brake control means adapted to be operated by fluid under pressure from said pipe to effect an application of brakes to a degree proportional to the pressure of operating fluid, valve means controlling communication between said pipe and brake control means controlled by pressure of fluid in said brake control means and operable upon supply of fluid under pressure to said pipe to close said communication upon obtaining a chosen pressure in said brake control means, and means controlled by pressure of fluid in said pipe operable upon an increase therein to a chosen pressure in excess of the first named chosen pressure to actuate said valve means to open said communication.

25. In a vehicle brake equipment in combination, a brake control pipe, means for supplying fluid under pressure to said pipe, brake control means adapted to be operated by fluid under pressure from said pipe to effect an application of brakes to a degree proportional to the pressure of operating fluid, valve means controlling communication between said pipe and brake control means, pressure sensitive means subject to pressure of fluid in said brake control means and a chosen opposing pressure for operating said valve means to open said communication when the pressure in said brake control means is less than said opposing pressure and to effect operation of said valve means to close said communication upon an increase in pressure in said brake control means exceeding said opposing pressure, and means responsive to a chosen higher pressure in said pipe operative to increase the opposing pressure on said pressure sensitive means in accordance with increase in pressure in said pipe above said chosen higher pressure.

26. In a vehicle brake equipment in combination, a brake control pipe, means for supplying fluid under pressure to said pipe, brake control means adapted to be operated by fluid under pressure from said pipe to effect an application of brakes to a degree proportional to the pressure of operating fluid, self-lapping valve means controlling communication between said pipe and brake control means including a movable abutment subject on one side to pressure of fluid in said brake control means, a spring exerting a chosen force on said abutment in opposition to pressure of fluid thereon for rendering said abutment operative upon a chosen increase in pressure of fluid in said brake control means to effect operation of said valve means to close said communication, another movable abutment subject to pressure of fluid in said pipe and arranged to be operated thereby to apply force to the first named abutment in opposition to pressure of fluid from said brake control means, and spring means acting on said other abutment with a chosen force opposing pressure of fluid thereon.

27. In a vehicle brake equipment in combination, an operator's brake valve device, a brake pipe, a straight-air pipe, and a fluid pressure supply pipe all connected to said brake valve device, valve means operative upon a reduction in pressure in said brake pipe to effect an application of brakes on said vehicle, means operative upon supply of fluid under pressure to said straight-air pipe to effect an application of said brakes, said operator's control device comprising valve means for opening and closing a brake pipe charging communication from said supply pipe to said brake pipe, a check valve for preventing flow of fluid under pressure from said brake pipe to said supply pipe by way of the last named valve means, and valve means for supplying fluid under pressure from said supply pipe to said straight-air pipe.

28. In a vehicle brake equipment in combination, an operator's control lever having a brake application zone, means operative in response to movement of said lever in said zone to effect an application of vehicle brakes to a degree corresponding to the position of said lever in said zone, valve means operable upon a reduction in pressure of fluid for effecting an application of brakes, a suppression valve controlling a fluid pressure reducing communication to said valve means and operable with said operator's control lever in a position in said zone, corresponding to a chosen degree of brake application, to close said communication and operable by said lever to open said communication for a less degree of brake application on the vehicle, and a safety control device comprising an operator's control handle and valve means controlling said communication controlled by said handle and operative to close said communication upon depression of said handle by the operator and to open said communication upon release of pressure on said handle.

29. In a vehicle brake equipment in combination, an operator's control lever having a brake application zone, means operative in response to movement of said lever in said zone to effect an application of vehicle brakes to a degree corresponding to the position of said lever in said zone, a brake pipe, valve means operable upon a reduction in pressure in a chamber to vent fluid under pressure from said brake pipe for effecting an application of brakes on said vehicle, a valve controlling a fluid pressure venting communication from said chamber operable to a closed position upon movement of said operator's control lever to a position in said zone corresponding to a chosen degree of brake application on the vehicle, said lever being operable to open said valve in all positions in said zone corresponding to lesser degrees of brake application on said vehicle, and a safety control device cooperative with said valve controlling the venting communication from said chamber, said safety control device comprising a valve controlling said communication and an operator's control handle operable upon depression to effect closure of the last named valve and upon release of manual pressure to effect opening of the last named valve.

30. In a vehicle brake equipment in combination, a straight-air pipe, an operator's brake valve device comprising a handle having a release position, a running position and a brake application zone, self-lapping valve means operable by said handle in said zone to provide fluid in said pipe at a pressure corresponding to the extent of movement of said handle into said zone from said running position and operative in said running position to open said pipe to atmosphere, and a valve controlling another atmospheric connection to said pipe operable by said handle only in said release position to open such connection.

31. In a vehicle brake equipment arranged to be controlled from either end of said vehicle in combination, a brake valve device for each end of said vehicle, a straight-air pipe connected to both of brake valve devices, each brake valve device comprising a handle having a brake releasing position, an application zone and a handle-off position, self-lapping valve means controlled by said handle for opening said pipe to atmosphere in said release position and for supplying fluid under pressure to said pipe in said application zone, and a valve controlled by said handle operable to close communication between said pipe and said self-lapping valve device in said handle-off position and for opening such communication in said brake releasing position and in said zone.

32. In a vehicle brake equipment in combination, a straight-air pipe, an operator's brake valve device comprising a handle having a position for releasing brakes and having a service application zone of movement, self-lapping valve means comprising a first means subject to pressure of fluid in said straight-air pipe and a second means controlled by said handle and cooperative with said first means upon movement of said handle into said zone to provide fluid in said straight-air pipe at a pressure corresponding to the position of said handle in said zone, said handle having an emergency position, means responsive to movement of said handle to said emergency position to supply fluid under pressure to said straight-air pipe at a pressure exceeding the maximum providable by said self-lapping valve means, and a valve controlled by said handle operable in said emergency position to close communication from said straight-air pipe to said self-lapping valve means and operable in said zone and brake release position to open such communication.

33. In a vehicle brake equipment in combination, a straight-air pipe, an operator's brake valve device comprising a handle having a position for releasing brakes and having a service application zone of movement, self-lapping valve means comprising a first means subject to pressure of fluid in said straight-air pipe and a second means controlled by said handle and cooperative with said first means upon movement of said handle into said zone to provide fluid in said straight-air pipe at a pressure corresponding to the position of said handle in said zone, said handle having an emergency position, means responsive to movement of said handle to said emergency position to supply fluid under pressure to said straight-air pipe at a pressure exceeding the maximum providable by said self-lapping valve means, a valve controlled by said handle operable in said emergency position to close communication from said straight-air pipe to said self-lapping valve means and operable in said zone and brake release position to open such communication, and another valve operable by said handle in said brake release position to open said straight-air pipe to atmosphere and operative in said zone to close the atmospheric connection to said straight-air pipe.

34. In a vehicle brake equipment in combination, a straight-air pipe, a release magnet device operable upon energization for releasing fluid under pressure from said straight-air pipe, an application magnet device operable upon energization for supplying fluid under pressure to said straight air pipe, a master switch device comprising movable abutment means subject to pressure of fluid in said straight-air pipe and an opposing fluid pressure and operable upon a preponderance in said opposing pressure to effect deenergization of said release magnet device and energization of said application magnet device, and operable upon a preponderance in said straight-air pressure to effect deenergization of said application magnet device and energization of said release magnet device, and operable upon substantial equalization of said straight-air pipe and opposing pressures to effect deenergization of both of said magnet devices, an operator's brake valve handle having a position for releasing brakes, and a service application zone, self-lapping valve means operable by said handle in said zone to supply fluid at a pressure corresponding to the position of said handle in said zone away from the release position to act on said movable abutment means in opposition to pressure of fluid in said straight-air pipe and operable in said brake releasing position to open a vent for releasing such fluid under pressure, a communication connecting said straight-air pipe to said self-lapping valve means, a check valve arranged to permit flow of fluid under pressure from said self-lapping valve means through said communication to said straight-air pipe, a spring acting on said check valve to hold it seated against pressure of fluid required from said self-lapping valve means to operate said master switch device, a communication by-passing said check valve, and a free check valve in the last named communication for permitting flow of fluid under pressure from said straight-air pipe to said self-lapping valve means but for preventing flow in the reverse direction.

35. In a vehicle brake equipment in combination, a straight-air pipe, a release magnet device operable upon energization for releasing fluid under pressure from said straight-air pipe, an application magnet device operable upon energization for supplying fluid under pressure to said straight-air pipe, a master switch device comprising movable abutment means subject to pressure of fluid in said straight-air pipe and an opposing fluid pressure and operable upon a preponderance in said opposing pressure to effect deenergization of said release magnet device and energization of said application magnet device, and operable upon a preponderance in said straight-air pipe pressure to effect deenergization of said application magnet device and energization of said release magnet device, and operable upon substantial equalization of said straight-air pipe and opposing pressures to effect deenergization of both of said magnet devices, an operator's brake valve handle having a position for releasing brakes, and a service application zone, self-lapping valve means operable by said handle in said zone to supply fluid at a pressure corresponding to the position of said handle in said zone away from the release position to act on said movable abutment means in opposition to pressure of fluid in said straight-air pipe and operable in said brake release position to open a vent for releasing such fluid under pressure, emergency means for effecting a supply of fluid to said straight-air pipe at a pressure greater than supplied by said self-lapping valve means, said handle having another position, and a valve controlled by said handle operable in said other position to close communication between said straight-air pipe and said self-lapping valve means and operable in said brake release position and service zone to open communication between said straight-air pipe and self-lapping valve means.

36. In a vehicle brake equipment in combination, a straight-air pipe, a release magnet device operable upon energization for releasing fluid under pressure from said straight-air pipe, an application magnet device operable upon energization for supplying fluid under pressure to said straight-air pipe, a master switch device comprising movable abutment means subject to pressure of fluid in said straight-air pipe and an opposing fluid pressure and operable upon a preponderance in said opposing pressure to effect deenergization of said release magnet device and energization of said application magnet device, and operable upon a preponderance in said straight-air pipe pressure to effect deenergization of said application magnet device and energization of said release magnet device, and operable upon substantial equalization of said straight-air pipe and opposing pressures to effect deenergization of both of said magnet devices, an operator's brake valve handle having a position for releasing brakes, and a service application zone, self-lapping valve means operable by said handle in said zone to supply fluid at a pressure corresponding to the position of said handle in said zone away from the release position to act on said movable abutment means in opposition to pressure of fluid in said straight-air pipe and operable in said brake release position to open a vent for releasing such fluid under pressure, said handle having a brake release position in addition to said position for releasing brakes, and a valve controlled by said handle operable in said brake release position to establish a fluid pressure vent from said straight-air pipe separate from said self-lapping valve means and operable in the other positions of said handle to close said vent.

37. In a vehicle brake equipment in combination, a straight-air pipe, a brake pipe, an application magnet device operative upon energization to supply fluid under pressure to said straight-air pipe, a release magnet device operative upon energization to release fluid under pressure from said straight-air pipe, an operator's brake valve handle having a brake control zone, self-lapping means controlled by said handle in said zone operative to control circuits for said magnet devices to provide fluid in said straight-air pipe at a pressure corresponding to the position of said handle in said zone, said handle also having an emergency position, means operative in response to movement of said handle to said emergency position to effect a reduction of pressure in said brake pipe, an emergency contactor device controlled by pressure of fluid in said brake pipe and operative with said brake pipe charged to render said magnet devices controllable by said self-lapping means and operative upon venting of fluid under pressure from said brake pipe to render said magnet devices non-controllable by said self-lapping means, said contactor device comprising means operative upon venting of said brake pipe to effect energization of said application magnet device.

38. In a vehicle brake equipment in combination, a straight-air pipe, a brake pipe, an application magnet device operative upon energization to supply fluid under pressure to said straight-air pipe, a release magnet device operative upon energization to release fluid under pressure from said straight-air pipe, an operator's brake valve handle having a brake control zone, self-lapping means controlled by said handle in said zone operative to control circuits for said magnet devices to provide fluid in said straight-air pipe at a pressure corresponding to the position of said handle in said zone, said handle also having an emergency position, means operative in response to movement of said handle to said emergency position to effect a reduction of pressure in said brake pipe, an emergency contactor device controlled by pressure of fluid in said brake pipe and operative with said brake pipe charged to render said magnet devices controllable by said self-lapping means and operative upon venting of fluid under pressure from said brake pipe to render said magnet devices non-controllable by said self-lapping means, said contactor device comprising means operative upon venting of said brake pipe to effect energization of said application magnet device, and a valve controlled by said handle operative in said emergency position to close communication between said straight-air pipe and said self-lapping means.

39. In a vehicle brake equipment in combination, a straight-air pipe, a brake pipe, an application magnet device operative upon energization to supply fluid under pressure to said straight-air pipe, a release magnet device operative upon energization to release fluid under pressure from said straight-air pipe, an operator's brake valve handle having a brake control zone, self-lapping means controlled by said handle in said zone operative to control circuits for said magnet devices to provide fluid in said straight-air pipe at a pressure corresponding to the position of said handle in said zone, said handle also having an emergency position, means operative in response to movement of sai hadle to said emergency position to effect a reduction of pressure in said brake pipe, an emergency contactor device controlled by pressure of fluid in said brake pipe and operative with said brake pipe charged to render said magnet devices controllable by said self-lapping means and operative upon venting of fluid under pressure from said brake pipe to render said magnet devices non-controllable by said self-lapping means, said contactor device comprising means operative upon venting of said brake pipe for effecting energization of said application magnet device, said handle also having a handle-off position, and means controlled by said handle operative in said handle-off position to prevent energization of said application magnet device upon operation of said contactor device in response to venting of said brake pipe.

40. In a double end brake equipment for a vehicle in combination, a straight-air pipe, a brake pipe, an emergency application magnet device operative upon energization to supply fluid under pressure to said straight-air pipe, a release magnet device operative upon energization to release fluid under pressure from said straight-air pipe, an operator's brake valve device for each end of the vehicle, a train wire connected to said application magnet device and to both of said brake valve devices and to opposite ends of the vehicle, two release wires one connected to each of said brake valve devices and to the respective end of the vehicle, a third wire connected to both brake valve devices, an emergency contactor device controlled by pressure of fluid in said brake pipe and operative upon charging of said brake pipe with fluid at a chosen pressure to disconnect said application magnet device from said third wire and to connect said release magnet device to both of said release wires and operative upon venting of fluid under pressure from said brake pipe to connect said application magnet device to said third wire and to disconnect said release magnet device from both of said release wires, a source of electrical energy, each of said brake valve devices comprising a control handle having a position for releasing brakes, a service application zone and a handle-off position, means operative by said handle in said handle-off position to disconnect said third wire from said source of electrical supply and in all other positions to connect said third wire to said source of electrical supply, self-lapping means controlled by said handle operative in the brake releasing position and in said zone for selectively controlling electrical connections between said third wire and said application and release magnet devices for either opening said straight-air pipe to atmosphere in said brake release position or for providing in said zone fluid in said straight-air pipe at a pressure corresponding to the position of said handle in said zone away from said brake release position.

41. In a fluid pressure brake equipment in combination, a brake pipe, means operative upon a reduction in pressure in said brake pipe for effecting an application of vehicle brakes, means for venting fluid under pressure from said brake pipe, a track operable trip valve device for also venting fluid under pressure from said brake pipe, a pipe connecting said trip valve device to said brake pipe through which the fluid under pressure from said brake pipe is vented by operation of said trip valve device, and a check valve arranged to prevent flow of fluid under pressure to the brake pipe from the pipe connecting said brake pipe to said trip valve device.

42. A brake equipment for a vehicle adapted to be operated in a train comprising a normally charged brake pipe, a fluid pressure supply pipe, means for connecting said brake pipe, but not said supply pipe to a counterpart on a coupled vehicle, a brake valve device having a brake application position for charging said brake pipe with fluid under pressure from said supply pipe and brake release and handle-off position for disconnecting said pipes from each other, and a valve device movable from a brake applying position to a brake release position upon charging said brake pipe, said valve device comprising means operable in brake release position of said valve device to establish a restricted communication from said supply pipe to said brake pipe and in brake applying position of said valve device to close said communication.

43. A brake equipment for a vehicle adapted to be operated in a train comprising a brake pipe, a straight-air pipe, a fluid pressure supply pipe, means for connecting said brake pipe and straight-air pipe, but not said fluid pressure supply pipe, to counterparts on a coupled car, a brake valve device comprising a handle having a brake applying position for opening said supply pipe to said brake pipe and brake releasing and handle-off positions for closing communication between said supply pipe and brake pipe, means operable in said brake applying position to open said straight-air pipe to said supply pipe and in said brake release and handle-off positions to close such communication, and an emergency valve device movable to a brake application position upon a reduction in pressure in said brake pipe and to a brake release position upon supply of fluid under pressure to said brake pipe and comprising means for opening said brake pipe to said supply pipe only in said brake release position.

44. A brake equipment for a vehicle adapted to be operated in a train comprising a brake pipe, a straight-air pipe, a fluid pressure supply pipe, means for connecting said brake pipe and straight-air pipe, but not said fluid pressure supply pipe, to counterparts on a coupled car, a brake valve device comprising a handle having a brake applying position for opening said supply pipe to said brake pipe and brake releasing and handle-off positions for closing communication between said supply pipe and brake pipe, means operable in said brake applying position to open said straight-air pipe to said supply pipe and in said brake release and handle-off positions to close such communication, a communication connecting said straight-air pipe to said supply pipe for permitting flow of fluid under pressure from the former to the latter, a check valve in the last named communication for preventing reverse flow of fluid under pressure therethrough, and an emergency valve device movable to a brake application position upon a reduction in pressure in said brake pipe and to a brake release position upon supply of fluid under pressure to said brake pipe and comprising means for opening said brake pipe to said supply pipe only in said brake release position.

SAMUEL L. WILLIAMS.
JOHN W. RUSH.

REFERENCES CITED

The following references are of record in the file of this patent:

UNITED STATES PATENTS

| Number | Name | Date |
| --- | --- | --- |
| 1,130,447 | Turner | Mar. 2, 1915 |
| 2,103,323 | Down | Dec. 28, 1937 |
| 2,112,423 | McCune | Mar. 29, 1938 |
| 2,112,424 | McCune | Mar. 29, 1938 |
| 2,121,543 | Hewitt | June 12, 1938 |
| 2,401,681 | Eaton | June 4, 1946 |